(12) United States Patent
Carter et al.

(10) Patent No.: US 11,725,433 B2
(45) Date of Patent: Aug. 15, 2023

(54) ELECTRONIC ACTUATED TONNEAU COVER STRIKER ASSEMBLY

(71) Applicant: Tectum Holdings, Inc., Ann Arbor, MI (US)

(72) Inventors: Chad Carter, Manchester, MI (US); Jerome Facchinello, Grand Blanc, MI (US)

(73) Assignee: Extang Corporation, Ann Arbor, MI (US)

(*) Notice: Subject to any disclaimer, the term of this patent is extended or adjusted under 35 U.S.C. 154(b) by 232 days.

(21) Appl. No.: 16/953,839

(22) Filed: Nov. 20, 2020

(65) Prior Publication Data
US 2021/0285266 A1    Sep. 16, 2021

Related U.S. Application Data

(60) Provisional application No. 63/032,333, filed on May 29, 2020, provisional application No. 62/990,169, filed on Mar. 16, 2020.

(51) Int. Cl.
| | |
|---|---|
| *E05C 3/12* | (2006.01) |
| *B60J 7/19* | (2006.01) |
| *B60R 16/03* | (2006.01) |

(52) U.S. Cl.
CPC ............ *E05C 3/12* (2013.01); *B60J 7/198* (2013.01); *B60R 16/03* (2013.01);
(Continued)

(58) Field of Classification Search
CPC ......... Y10T 292/1083; Y10T 292/1082; Y10T 292/699; E05C 3/12; B60J 7/198; B60R 16/03; E05Y 2201/686; E05Y 2201/716; E05Y 2201/722; E05Y 2900/53; E05B 47/0001; E05B 17/0029; E05B 81/00; E05B 81/04
(Continued)

(56) References Cited

U.S. PATENT DOCUMENTS 5,263,761 A * 11/1993 Hathaway ............... B60J 7/104
296/100.18
5,715,713 A    2/1998 Aubry et al.
(Continued)

FOREIGN PATENT DOCUMENTS

CA    2992906 A1 * 10/2018    ............ B60J 7/198
DE  19835821 A1 *  2/2000    ............ E05B 83/26
(Continued)

OTHER PUBLICATIONS

Canadian Office Action dated Nov. 17, 2022, Application No. 3,101,456.

*Primary Examiner* — Kristina R Fulton
*Assistant Examiner* — Steven A Tullia
(74) *Attorney, Agent, or Firm* — The Dobrusin Law Firm, P.C.

(57) ABSTRACT

A striker assembly comprising: (a) a latch that releasably engages a tonneau cover or a truck cap; and (b) an actuator in communication with the latch to actuate the latch between an open position and a closed position, wherein the actuation causes the tonneau cover or the truck cap to move between the open position and the closed position; wherein actuation is initiated wirelessly based on an input signal received by the actuator.

15 Claims, 15 Drawing Sheets

(52) U.S. Cl.
CPC ... *E05Y 2201/686* (2013.01); *E05Y 2201/716* (2013.01); *E05Y 2201/722* (2013.01); *E05Y 2900/53* (2013.01)

(58) Field of Classification Search
USPC .......... 296/100.04, 100.07, 100.16, 163, 164
See application file for complete search history.

(56) References Cited

U.S. PATENT DOCUMENTS

| | | | | |
|---|---|---|---|---|
| 5,774,060 | A * | 6/1998 | Ostermann | ........ G07C 9/00309 340/10.5 |
| 6,076,881 | A | 6/2000 | Tucker | |
| 6,234,561 | B1 * | 5/2001 | Huotari | .................... B60J 7/102 296/100.15 |
| 6,290,441 | B1 | 9/2001 | Rusu | |
| 6,299,232 | B1 | 10/2001 | Davis | |
| 6,343,494 | B2 | 2/2002 | Roos et al. | |
| 6,361,086 | B1 | 3/2002 | Robbins | |
| 6,386,599 | B1 | 5/2002 | Chevalier | |
| 6,427,500 | B1 | 8/2002 | Weinerman | |
| 6,427,502 | B1 | 8/2002 | Zagoroff | |
| 6,623,062 | B1 * | 9/2003 | Hoffman | ................ B60J 7/1621 296/100.1 |
| 6,702,358 | B2 * | 3/2004 | Comstock | .................. B60J 7/10 292/DIG. 43 |
| 6,702,360 | B1 | 3/2004 | Santos | |
| 6,951,363 | B2 * | 10/2005 | Hoffman | ................ B60J 7/1621 296/100.1 |
| 7,780,218 | B2 * | 8/2010 | Habacker | ................ B60J 7/19 296/124 |
| 8,029,029 | B2 | 10/2011 | Terhaar | |
| 8,250,889 | B2 | 8/2012 | Zagoroff | |
| 8,328,299 | B2 * | 12/2012 | Hashemi | ............... A47B 88/463 312/333 |
| 10,023,035 | B2 * | 7/2018 | Facchinello | ............. B60J 7/198 |
| 10,471,815 | B2 | 11/2019 | Carter et al. | |
| 2001/0020792 | A1 | 9/2001 | Huotari | |
| 2002/0063438 | A1 | 5/2002 | Rusu | |
| 2002/0096268 | A1 * | 7/2002 | Schmeichel | ............. B60P 7/02 160/328 |
| 2002/0096910 | A1 * | 7/2002 | Schmeichel | ............. B60P 7/04 160/375 |
| 2002/0105200 | A1 * | 8/2002 | Reynolds | ............. E05B 47/026 296/3 |
| 2004/0160083 | A1 * | 8/2004 | Marx | ....................... B60J 7/041 296/100.09 |
| 2005/0040969 | A1 * | 2/2005 | Heyn | .................. B60R 16/0315 340/13.24 |
| 2005/0146158 | A1 * | 7/2005 | Schmeichel | ............. B60J 7/102 296/100.16 |
| 2005/0264024 | A1 | 12/2005 | Mulder et al. | |
| 2008/0111390 | A1 | 5/2008 | Smith | |
| 2010/0050708 | A1 * | 3/2010 | Zogoroff | ................. E05B 81/18 70/101 |
| 2011/0056253 | A1 * | 3/2011 | Greiner | ............... E05B 47/0002 70/277 |
| 2011/0175375 | A1 | 7/2011 | Terhaar | |
| 2014/0042754 | A1 * | 2/2014 | Spencer | .................. B60J 7/141 292/7 |
| 2015/0191943 | A1 * | 7/2015 | Tieman | ................... E05B 85/26 292/195 |
| 2015/0233452 | A1 | 8/2015 | Martinez et al. | |
| 2016/0096423 | A1 * | 4/2016 | Facchinello | ............. B60J 7/106 292/256 |
| 2016/0108648 | A1 * | 4/2016 | Nam | ..................... B60K 15/05 292/142 |
| 2017/0361692 | A1 * | 12/2017 | Corder | ...................... E05C 3/16 |
| 2018/0179789 | A1 * | 6/2018 | Ciarmatori | ............. B60K 15/05 |
| 2018/0297457 | A1 * | 10/2018 | Spencer | .................. B60J 7/198 |
| 2019/0193538 | A1 * | 6/2019 | Carter | ..................... B62D 33/03 |

FOREIGN PATENT DOCUMENTS

| | | | | |
|---|---|---|---|---|
| DE | 602005004846 T2 * | 2/2009 | ............ | B60J 7/1851 |
| DE | 10 2012 017 515 A1 | 3/2014 | | |
| DE | 102012204490 B4 * | 5/2017 | ............ | E05C 19/02 |
| DE | 102018116573 A1 * | 6/2019 | ............ | B60J 7/141 |
| EP | 0492006 A1 * | 12/1990 | ............ | E05B 83/26 |

* cited by examiner

US 11,725,433 B2

1

ELECTRONIC ACTUATED TONNEAU COVER STRIKER ASSEMBLY

FIELD

The present teachings generally relate to striker assembly, and more particularly, to an electronically actuated striker assembly that actuates a tonneau cover or a truck cap.

BACKGROUND

A tonneau cover is a cover that may be placed over the cargo box of a vehicle. The tonneau cover may protect an interior of the cargo box of the vehicle from dirt, debris, moisture, other contaminants, or a combination thereof. The tonneau cover may move between an open position and a closed position. When the tonneau cover is in the open position, the tonneau cover may be spaced apart from a top edge of a least a portion of the cargo box and/or a tailgate of the vehicle. When in the open position, a user may access an interior of the cargo box free of obstruction from the tonneau cover. When the tonneau cover is in a closed, the tonneau cover may substantially rest along a top edge of the cargo box and/or tailgate.

When the tonneau cover is in the closed configuration, opening or lowering the tailgate may be hindered by the tonneau cover resting on the top edge of the tailgate. For example, the weight and/or position of the tonneau cover relative to the top edge of the tailgate may create or increase friction between the tailgate and the tonneau cover, thereby potentially causing the tailgate to contact, drag, stick, or a combination thereof to the tonneau cover when opening or lowering the tailgate.

Similarly, when the tonneau cover is in the closed position, closing or raising the tailgate may be hindered by the tonneau cover. For example, the position of the tonneau cover when in the closed position relative to the top edge of the tailgate may create an obstruction or increase friction between the tailgate and the tonneau cover, thereby potentially causing the tailgate to contact, drag, stick, or a combination thereof to the tonneau cover when closing or raising the tailgate.

In addition to requiring additional force to open and/or close the tailgate when the tonneau cover is in the closed position, the contact, dragging, and/or sticking of the tailgate against the tonneau cover may also undesirably scratch the top edge of the tailgate and/or the lower or inside surface of the tonneau cover. The contact, dragging, and/or sticking may also undesirably cause seals or surfaces of the tonneau cover and/or tailgate to wear, which may undesirably allow for dirt, debris, moisture, other contaminants, or a combination thereof to enter the cargo box.

Some pickup truck platforms provide a mechanism for automatically opening and closing a tailgate. However, if the friction, contact, dragging, and/or sticking between the tonneau cover and the tailgate is greater than the force that the mechanism is configured to apply on the tailgate to open or close the tailgate, the mechanism will be unable to function as intended to open and/or close the tailgate when the tonneau cover is in the closed position.

To overcome the aforementioned problems, mechanisms may be used to help reduce or eliminate the friction, contact, drag, and/or sticking between the tonneau cover and a tailgate when opening or lowering the tailgate, when closing or raising the tailgate, or both. However, often times the mechanism utilized is manually actuated and may still be

2 unable to overcome a force of the friction, contact, drag, and/or sticking between the tonneau cover and the tailgate.

An example of a mechanism may be found in U.S. Pat. No. 10,471,815, all of which is incorporated herein for all purposes. There remains a need for an assembly that may reduce or eliminate the friction, contact, drag, and/or sticking between the tonneau cover and the tailgate when opening or lowering the tailgate, closing or raising the tailgate, or both. What is need is an assembly that may actuate the tonneau cover between the open and closed positions. There remains a need for an assembly that may be operated free of manual application of force. What is needed is an assembly for actuating a tonneau cover that may be automatically actuated using an electrically powered mechanism. There remains a need for an assembly that may close or lock a tonneau cover, open or unlock a tonneau cover, or both free of manual interaction. What is needed is an assembly that actuates a tonneau cover based on electronic feedback, electronic input, one or more commands, or a combination thereof.

SUMMARY

The present teachings meet one or more of the present needs by providing: a striker assembly comprising: (a) a plunger; (b) a latch that releasably engages a tonneau cover or a truck cap; and (c) an actuator in communication with the latch to actuate the latch between an open position and a closed position, wherein the actuation causes the tonneau cover or the truck cap to move between the open position and the closed position; wherein movement of the plunger triggers the actuator to move the latch between the open position and the closed position.

The present teachings meet one or more of the present needs by providing a striker assembly, wherein: the actuator moves the latch to an open position when the plunger is moved away from the latch; the actuator moves the latch to a closed position when the plunger is moved towards the latch; movement of the plunger sends a signal to the actuator to initiate actuation; the plunger is connected to a shaft, and movement of the shaft based on the movement of the plunger signals the actuator to initiate actuation; a spring is engaged by the shaft and movement of the plunger towards the latch compresses the spring, and uncompressing the spring causes the plate to move away from the latch; the plunger moves independently of the latch; the actuator includes an armature connected to the latch that moves the latch between the open and closed positions; or a combination thereof.

The present teachings meet one or more of the present needs by providing: a striker assembly comprising: (a) a latch that releasably engages a tonneau cover or a truck cap; and (b) an actuator in communication with the latch to actuate the latch between an open position and a closed position, wherein the actuation causes the tonneau cover or the truck cap to move between the open position and the closed position; wherein actuation is initiated wirelessly based on an input signal received by the actuator.

The present teachings may also meet one or more of the present needs by providing a striker assembly, wherein: the actuator includes an armature connected to the latch that moves the latch between the open and closed positions; the latch is guided along a slot in a housing of the latch and an axis of the slot is substantially parallel to, or coaxial with, a direction of movement of the latch; the latch is guided along the slot by a guide pin positioned within the housing of the latch; the latch includes a notch that receives and secures a portion of the tonneau cover or the truck cap; the notch secures the portion of the tonneau cover or the truck cap with a clasp movably engaged to the notch; or a combination thereof.

The present teachings may meet one or more of the present needs by providing a vehicle comprising a striker assembly, wherein: the vehicle comprises a tailgate, and movement of the tailgate sends a signal to the actuator to initiate actuation of the latch; the vehicle comprises a fender, and the assembly is attached to the fender; or both.

The present teachings may also meet one or more of the present needs by providing a striker assembly, comprising: (a) a latch that releasably engages a tonneau cover a truck cap; and (b) an actuator connected to the latch via an armature to actuate the latch between an open position and a closed position, wherein the actuation causes the tonneau cover or the truck cap to move between the open position and the closed position; wherein substantially linear actuation of the armature pivots the latch about a pivot axis. Additionally, the latch may include a notch that receives and secures a portion of the tonneau cover with a clasp movably engaged to the notch. Moreover, the armature may contact the latch between the notch and the pivot axis.

The present teachings may further meet one or more of the present needs by providing a striker assembly, comprising: (a) a latch that releasably engages a tonneau cover or a truck cap; and (b) an actuator connected to the latch by linkage to actuate the latch between an open position and a closed position, the actuator comprising: (1) a motor; (2) a pinion driven by the motor; and (3) a gear rack in communication with the pinion to translate movement of the pinion into movement of the gear rack. Additionally, the pinion may be rotated by the motor to move the gear rack linearly to actuate the latch and/or the motor may communicate with an intermediary gear box to drive the pinion. Moreover, the actuator may further include an actuator bracket, and the actuator bracket may be secured within a side rail of a cargo box so that actuator remains stationary while the gear rack moves along the side rail. Furthermore, the tonneau cover may also include a rail lock that receives a portion of the side rail within a lip to prevent movement of the tonneau cover, and the guide pin may also extend into a slot of a rail lock to move the rail lock relative to the side rail during articulation.

The present teachings meet one or more of the present needs by providing: an assembly that may reduce or eliminate the friction, contact, drag, and/or sticking between the tonneau cover and the tailgate when opening or lowering the tailgate, closing or raising the tailgate, or both; an assembly that may actuate the tonneau cover between the open and closed positions; an assembly that may be operated free of manual application of force; an assembly for actuating a tonneau cover that may be automatically actuated using an electrically powered mechanism; an assembly that may close or lock a tonneau cover, open or unlock a tonneau cover, or both free of manual interaction; an assembly that actuates a tonneau cover based on electronic feedback, electronic input, one or more commands, or a combination thereof; or a combination thereof.

DETAILED DESCRIPTION

Figure 1:
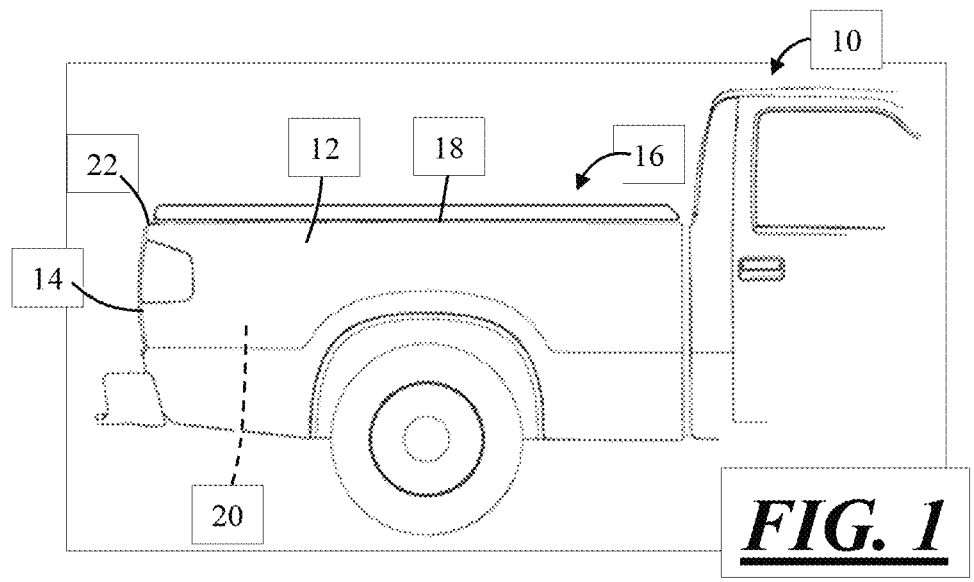
FIG. 1 illustrates a side view of a vehicle and a tonneau cover having a tailgate of the vehicle and the tonneau cover both in a closed position.

The explanations and illustrations presented herein are intended to acquaint others skilled in the art with the teachings, its principles, and its practical application. Those skilled in the art may adapt and apply the teachings in its numerous forms, as may be best suited to the requirements of a particular use. Accordingly, the specific embodiments of the present teachings as set forth are not intended as being exhaustive or limiting of the teachings. The scope of the teachings should, therefore, be determined not with reference to the description herein, but should instead be determined with reference to the appended claims, along with the full scope of equivalents to which such claims are entitled. The disclosures of all articles and references, including patent applications and publications, are incorporated by reference for all purposes. Other combinations are also possible as will be gleaned from the following claims, which are also hereby incorporated by reference into this written description.

The present teachings generally relate to a striker assembly in communication with a tonneau cover. The tonneau cover may function to protect against dirt, debris, water, other contaminants, or a combination thereof from entering an inside of a cargo box. The tonneau cover may be a cover that functions to conceal the inside of the cargo box and/or any contents inside the cargo box. The tonneau cover may be placed over the cargo bed of a vehicle, such as a pickup truck.

The tonneau cover may comprise multiple enclosure panels or a single panel. One or more of the panels may be moved or repositioned relative to one another to move the tonneau cover between an open position and a closed position. One or more of the panels may be substantially rigid. One or more of the panels may be substantially flexible but may be stabilized with a rigid frame. Alternatively, the tonneau cover may be a single panel cover. The single panel cover may be raised or pivoted relative to the walls or top edges of the cargo box and/or tailgate to reposition the tonneau cover between an open position and a closed position.

The tonneau cover may be secured to a cargo box of a vehicle using one or more side rails. The side rails may function to removably secure the tonneau cover along a top edge of the cargo box. The side rails may be disposed along a length of the cargo box, a width of the cargo box, or both. The side rails may also be mounted to the tailgate. It is envisioned that the side rails may also be secured to any portion of the cargo box, such as an inner panel or fender, an outer panel or fender, or both. The side rails may be mounted to the cargo box so that the side rails remain stationary when the tonneau cover is opened or raised, closed or lowered, or a combination thereof. The side rails may also include one or more channels. The channels may receive a portion of the tonneau cover, one or more striker assemblies, a rail lock, or a combination thereof. The channels may extend latitudinally, longitudinally, or both along the side rails. For example, the channels may extend substantially parallel to, or coaxial with, sides of the cargo box.

The open or raised position of the tonneau cover may be when the tonneau cover, or at least one enclosure panel of the tonneau cover, is free from contacting, engaging, or is spaced apart from: the tailgate, a top edge of the tailgate, the walls of the cargo bed, a top edge or top surface of the one or more walls of the cargo bed, or a combination thereof. The open or raised position of the tonneau cover may be when the tonneau cover, or at least one enclosure panel of the tonneau cover, is in contact with, engages, or rests on the tailgate, a top edge or top surface of the tailgate, a top edge or top surface of the one or more walls of the cargo box, or a combination thereof, but applies less force or pressure thereon compared to when the tonneau cover is in the closed or lowered position.

The vehicle, the tonneau cover, or both may comprise one or more striker assemblies. Alternatively, the one or more striker assemblies may be a stand-alone component or assembly that is obtainable and/or installed with or on the tonneau cover and/or vehicle via a retrofit or aftermarket application.

The one or more striker assemblies may function to at least partially move, displace, open, raise, pop-open, separate, or a combination thereof the tonneau cover away from a top edge or surface of the tailgate, a top edge or surface of the cargo box, or both. For example, as the tailgate begins to be lowered or drawn down into an open position, the one or more striker assemblies may simultaneously or contemporaneously at least partially move, displace, open, raise, pop-open, separate, or a combination thereof at least a portion of the tonneau cover away from the top edge of the tailgate, the top edge of the cargo box, or both. Doing so may advantageously reduce or eliminate friction, contact, drag, sticking, or a combination thereof between the tonneau cover and the tailgate while the tailgate is being opened or lowered. For example, the one or more striker assemblies may provide for opening or lowering the tailgate with lower a force, prevent scratching or other damage to either or both of the inside surface of the tonneau cover and the tailgate, or both.

The one or more striker assemblies may be adapted to at least partially move, displace, open, raise, pop-open, separate, or a combination thereof at least a portion of the tonneau cover away from the top edge of the tailgate, the top edge of the cargo box, or both immediately before the tailgate begins to be lowered or drawn down into the open position. For example, the one or more striker assemblies may move the tonneau cover when the tailgate latch or handle is manipulated, but before the tailgate is actually moved. Alternatively, the one or more striker assemblies may be adapted to at least partially move, displace, open, raise, pop-open, or separate at least a portion of the tonneau cover away from the top edge of the tailgate, the tope edge of the cargo box, or both immediately after the tailgate begins to be lowered or drawn down into the open position.

The one or more striker assemblies may be adapted to at least partially move, close, lower, pull-down, draw, or a combination thereof the tonneau cover towards the top edge of the tailgate, the top edge of the cargo box, or both after the tailgate is moved into the closed or raised position. Alternatively, as the tailgate begins to be raised or pushed up into the closed position, the striker assembly may at least partially move, close, lower, pull-down, draw, or a combination thereof at least a portion of the tonneau cover towards the top edge of the tailgate, the top edge of the cargo box, or both. The one or more striker assemblies may at least partially move, close lower, pull-down, draw, or a combination thereof at least a portion of the tonneau cover towards the top edge of the tailgate, the top edge of the cargo box, or both immediately before the tailgate is moved into the final raised or closed position. The one or more striker assemblies may move the tonneau cover into the closed position at substantially the same time that the tailgate is moved into the raised or closed position. Moving the tailgate into the close position according to any one of the aforementioned sequences may advantageously reduce or eliminate friction, contact, drag, sticking, or a combination thereof between the tonneau cover and the tailgate while the tailgate is being closed or raised. For example, the striker assembly may provide for closing or raising the tailgate with lower a force, prevent scratching or other damage to either or both of the inside surface of the tonneau cover and tailgate, or both.

The one or more striker assemblies may be located, contained within, or positioned inside a fender defining the cargo box of the vehicle. Locating the one or more striker assemblies inside a fender may be advantageous in that space inside the cargo box is not taken up by the one or more striker assemblies and/or changes of damaging the one or more striker assemblies by loading and unloading items in the cargo box may be reduced.

The one or more striker assemblies may be located or positioned on an inside fender wall defining the cargo box. For example, the striker assembly may be located on an exterior surface of the fender or wall and extend into a footprint of the cargo box. Locating the one or more striker assemblies on an inside fender wall defining the cargo box may provide for easy installation and/or service.

One or more striker assemblies may be located on or inside one (i.e., either the driver or passenger side fender), or on or inside two fenders (i.e., both the driver and the passenger side fenders).

One or more striker assemblies may be located on or inside a tailgate of the vehicle. For example, the one or more striker assemblies may be configured to lock or unlock a tonneau cover directly to the tailgate. The one or more striker assemblies may thus move with the tailgate when the tailgate is opened or lowered, closed or raised, or both. All or a portion of the striker assemblies may be located on the tailgate.

It is also envisioned that the one or more striker assemblies may be mounted on a tonneau cover of a vehicle. The striker assemblies may be positioned along an underside of a tonneau cover substantially within a cargo box of a vehicle so that the striker assemblies engage a portion of the cargo box, one or more fenders, the tailgate, or a combination thereof. The cargo box, one or more fenders, the tailgate, or a combination thereof may include an engaging mechanism, such as a striker pin, hook, projection, etc., that communicates with the striker assemblies.

The one or more striker assemblies may also be located or positioned on a mounting feature of the tonneau cover. For example, the striker assembly may be mounted along a side rail of a tonneau cover assembly that is fixed to the cargo box of a vehicle. The mounting feature may be a portion of the cargo box or may be secured to the cargo box of a vehicle. Locating the striker assembly on a side rail secured to the cargo box may provide for easy installation and minimizing additional mounting components. Therefore, advantageously, the striker assembly may be secured to the existing bracketry of the tonneau cover. Additionally, the striker assembly may be positioned directly adjacent to the tonneau cover to move all or a portion of the tonneau cover. Thus, it may be gleaned from the present teachings that the one or more striker assemblies are adaptable for various configurations of vehicles and may be mounted in any desired positions.

The striker assemblies may include a latch. The latch may function to engage the tonneau cover of a vehicle. The latch may be actuated by an actuator of the striker assembly to move the tonneau cover of the vehicle. The latch may articulate to move all or a portion of the tonneau cover. The latch may include a stationary portion and a movable portion. For example, the latch may include a base secured to the cargo box or a side rail attached to the cargo box. A hinge may then be pivotally secured to the base to pivot and move all or a portion of the tonneau cover.

The latch may comprise one or more notches. The notches may function to engage, or be connected to, or attached to, any suitable portion of the tonneau cover. For example, the notches may engage or connect to a supporting rail or connector that extends on an underside or top side of the tonneau cover (in a cross-car vehicle direction and/or a fore-aft vehicle direction); a side or edge of the tonneau cover; etc. The notches may be located along a hinge of the latch, a base of the latch, or both. The notches may engage or connect to a striker plate or a ring of the striker plate that may be received within the notches. The notch may be made from a plastic material that is generally rigid, or a plastic material that is at least partially flexible. The notch may work in conjunction with a clasp to secure the tonneau cover. The clasp may move (e.g., pivot) relative to the notch to allow for ingress and/or egress of a portion of the tonneau cover into and/or from the notch. For example, the clasp may pivot relative to the notch to receive the tonneau cover but may retain the tonneau cover when received by the notch until a desired operation releases the clasp to disconnect the tonneau cover. The clasp may also be any finger, pin, or other locking mechanism that operates in a manner to removably secure at least a portion of the tonneau cover to the striker assemblies.

The striker assemblies may comprise one or more actuators. The actuators may function to actuate at least a portion of the strike assemblies. For example, the actuators may move a latch of the striker assemblies between an open or unlocked position and a closed or locked position. When the latch is connected to the tonneau cover, the actuator may move the tonneau cover between the open or unlocked position and the closed or locked position. The actuator may directly or indirectly drive the latch. For example, the actuator and the latch may be directly connected within the same housing so that actuation of the actuator directly drives the latch. Alternatively, the actuator may be connected to the latch by linkage, a chain, a belt, a rod, or a combination thereof so that actuation of the actuator drives one or more intermediary parts that in turn drive the latch.

The actuator may be located anywhere within or on the cargo box relative to one or more latches. Advantageously, the actuator may be positioned near a cab of a vehicle while the latch is positioned closer to the tailgate. Therefore, the present teachings beneficially allow the latch and the actuator to be packaged independently, thereby decrease the necessary space in any one location along the cargo box, within the cargo, along the tonneau cover, of a combination thereof. Additionally, an intermediary component such as linkage, a chain, a belt, a rod, or a combination thereof may connect an actuator spaced apart from a latch so that the actuator may be located closer to a power source (e.g., a wire harness of the vehicle connected to a battery) while the latch is positioned near a portion of the tonneau cover that may be opened and closed.

The actuator may move at least a portion of the striker assembly (e.g., a latch) based on an input received by the actuator. The input may be received by a receiver of the actuator or may be triggered by one or more sensors. The input may come from a portion of the striker assembly. For example, movement of a shaft and/or plunger of the striker assembly may trigger actuation of the actuator. The input may be received from somewhere other than a portion of the striker assembly. The input may receive a signal via the receiver from a wireless remote, fob (e.g., a vehicle key fob), mobile phone, computer, other electronic device, or a combination thereof. As such, it is contemplated that the striker assembly may be free of any manual input or operation to move the striker assembly. Therefore, it may be advantageous to articulate the striker assembly, and thus the tonneau cover, without a user being near the car. For example, the vehicle may include one or more proximity sensors to sense when a key fob or other item of a user is within a generally vicinity of the vehicle. After entering the vicinity, the sensor may send a signal to the actuator to actuate the striker assembly. Alternatively, a user may press a button on the key fob to actuate the striker assembly.

The actuator may receive wireless input or may receive a signal over wiring connected to the actuator. A button, sensor, latch, switch, other mechanism, or a combination thereof along the vehicle may be wired to the actuator so that an operation of the button, sensor, latch, switch, other mechanism, or a combination thereof may send a signal to the actuator to move the striker assembly. For example, one or more capacitive touch sensors along the vehicle may be touched by a user to send a signal to the actuator to open or unlock the striker assembly, and thus the tonneau cover.

The actuator may be powered via a power device located on the vehicle. The power device may be a vehicle battery. The power device may be a dedicated power source, such as an independent battery located near or within the cargo box. The actuator may be solar powered. The actuator may be rechargeable.

The actuator may incrementally move at least a portion of the striker assembly in any desired manner. The actuator may move the striker assembly from an open or unlocked position and a closed or locked position. However, the actuator may also move the striker assembly to one or more positioned between the open or unlocked and the closed or locked position.

The actuator may move the striker assembly using an armature. The armature may be powered by the actuator to move a portion of the armature (e.g., an arm). The armature may move in a substantially linear manner, a nonlinear manner, or both. The armature may move in a linear direction, yet the striker assembly may move in a nonlinear direction. The armature may be connected to a portion of the striker assembly, such as a latch, that may be intended to move.

The actuator may move the striker assembly, or a portion of the striker assembly such as a latch, using a gear rack. The gear rack may function to translate a movement of the actuator into movement of the latch or other portion of the striker assembly. The gear rack may translate a rotational movement of the actuator into a substantially linear movement. For example, the gear rack may move in a substantially linear direction based on a rotational movement of the actuator, which in turn causes the gear rack to move linkage connected to a latch in a substantially linear direction. The linkage may then move the latch (e.g., a hinge of the latch) to open the tonneau cover, close the tonneau cover, or both.

It is therefore envisioned that the gear rack may be mounted to a portion of the vehicle that allows movement of the gear rack. For example, an actuator bracket may include a portion, such as a leg, that fixes the actuator to a channel of a side rail secured to the cargo box. The gear rack may then be nested near a portion of the within the channel so that the gear rack may move a defined distance along the channel to move the latch directly or indirectly. The movement distance may be defined as a space between mounting portions of the actuator bracket between which the gear rack is positioned.

The gear rack may communicate with one or more gears, one or more armatures, or both of the actuator to translate movement of the actuator into movement of the latch. The gear rack may communicate by directly connecting an arm of the actuator to the gear to move the gear rack. The gear rack may include a mating feature to communicate with the actuator. For example, the gear rack may include teeth that mesh with teeth of one or more gears of the actuator.

The one or more gears of the actuator in communication with the gear rack may be a pinion. The pinion may rotate based on actuation of the actuator. The pinion may rotate in a clockwise direction, a counterclockwise direction, or both. For example, the pinion may rotate clockwise to open the tonneau cover and counterclockwise to close the tonneau cover, or vice versa. The pinion may incrementally stop in any desired location between a fully open position and a fully closed position of the tonneau cover to partially open all or a portion of the tonneau cover. The pinion may be exposed or positioned along an outside of an actuator housing to interact with the gear rack or other components of the striker assembly. Movement of the pinon may be beneficially axial movement to minimize packaging space within the cargo box. Therefore, a substantially or entirely rotational movement of the pinion may be directly translated into a linear move of the gearbox based on teeth of the pinion meshing with teeth of the gear rack.

The pinion may be rotated based on movement of a gearbox. The gearbox may function to receive power from the actuator or an external power source and translate that power into rotation of the pinion, movement of another actuated component, or both. For example, the actuator may include a motor that drives the gearbox. The gearbox may be housed within an actuator housing or connected to the actuator housing. The pinion may protrude from the gearbox. The gearbox may include one or a plurality of interconnected gears. The gears may be tuned to increase torque, decrease torque, or both depending on an application, such as a size and/or weight of a tonneau cover, a truck cap, or both.

The actuator may also include one or more solenoids. The actuator may include a transmitter, one or more capacitors, one or more transistors, or a combination thereof. The actuator may include one or more batteries. The actuator may include one or more gears, one or more rotary members, or both. The actuator may include one or more valves, switches, or both. It is envisioned that the actuator may be any desired electromechanical device that may operate to move at least a portion of the striker assembly based on power received from an external or internal electrical power source.

The actuator may be in communication with one or more components of the striker assembly. The actuator may be in communication with a plunger, shaft, latch, or a combination thereof of the striker assembly. The actuator may be connected to one or more components of the striker assembly. For example, an armature of the actuator may be secured to a latch to move the latch between an open or unlocked position and a closed or locked position. The actuator may be positioned within a cover of the striker assembly. The actuator may be housed within a housing of the latch so that the actuator moves with the latch during actuation. The actuator may also be positioned outside of a housing or cover of the striker assembly. For example, the actuator may be mounted to a fender of the cargo box adjacent to, or abutting, a portion of the striker assembly. The actuator may be movably secured to a portion of the striker assembly or the actuator may remain positionally stationary when actuating a portion of the striker assembly. Thus, it may be gleaned from the present teachings that the actuator may be configured in various manners to meet the demands of a given application. For example, a size and type of actuator may be selected based on packaging requirements of a given vehicle.

While the actuator may primarily drive movement of a latch or other portion of a striker assembly to open and/or close all or a portion of a tonneau cover, the actuator may also drive movement of one or more additional components of the vehicle. The actuator may also drive movement of the tailgate so that the system may beneficially need only one actuator to move both the tailgate and the tonneau cover. The tailgate may be moved simultaneously with the tonneau cover or independently of the tonneau cover.

The actuator may move a rail lock. The rail lock may function to lock and unlock opening of the tonneau cover. The rail lock may be in communication with the side rails to prevent unwanted movement of the tonneau cover during operation of the vehicle or when the vehicle and tailgate are locked. The rail lock may be in communication with the tonneau cover or one or more components of the tonneau cover to prevent unwanted movement of the tonneau cover. For example, the rail lock may include a lip that extends around a portion of the tonneau cover or an intermediary component connect to the tonneau cover to prevent movement of the tonneau cover. The rail lock may slide along the side rail to move between a locked position and an unlocked position. The rail lock may be in a locked position when the tonneau cover is in a closed so that the tonneau cover may not be opened. The rail lock may be in an unlocked position when the tonneau cover.

The rail lock may move relative to the side rail in any desired manner. The rail lock may move laterally, axially, vertically, pivotally, or a combination thereof relative to the side rail. The rail lock may move inwardly towards an interior of a cargo box, outwardly towards a perimeter of the cargo box, or both. It is envisioned that movement of the rail lock may be guided by one or more guide pins or rail pins interconnecting the rail lock to the actuator, the side rails, or both. For example, a gear rack of the actuator may include a guide pin positioned within a slot of the rail lock. When the gear rack is actuated, the guide pin is moved along the slot of the rail lock, thereby moving the rail lock in a direction dictated by the slot. One or more additional rail pins or guide pins and/or slots may be interconnected aid in movement of the rail lock. The pins, slots, or both may be located near the actuator, near terminal ends of the side rails or rails locks, near the latch, or a combination thereof.

A direction of movement of the rail lock may be substantially perpendicular to a direction of movement of the actuator or a portion of the actuator (e.g., a direction of movement of the gear rack). A direction of movement of the rail lock may be substantially parallel to a direction of movement of the actuator or a portion of the actuator. It is envisioned that both the actuator and the rail lock may communicate with the side rail during operation, yet the side rail may remain stationary. That is, the side rail may be fixedly mounted to a portion of the cargo box and help guide the actuator and/or the rail lock, yet the side rail may itself remain substantially in place during operation. Therefore, the side rail may advantageously eliminate additional components or parts generally needed to create a dynamic system attempting so operate in a similar manner.

Turning now to the figures, FIG. 1 illustrates a side view of a vehicle 10. The vehicle 10 comprises a cargo box 12 and a tailgate 14. As shown, the tailgate 14 is in a closed or raised position, where the tailgate 14 is at or near a vertical, upright position relative to the ground.

A tonneau cover 16 is placed onto a top edge 18 of the cargo box 12. The tonneau cover 16 may protect against dirt, debris, water, other contaminants, or a combination thereof from entering an inside 20 of the cargo box 12. The tonneau cover 16 is illustrated in the closed or lowered position. As shown, when the tonneau cover 16 is in in the closed or lowered position, the tonneau cover 16 may be in contact with, or at least partially cover, a top edge 18 of the cargo box 12. Additionally, the tonneau cover 16 in the closed or lowered position may contact or at least partially cover a top edge 22 of the tailgate 14.

Figure 2:
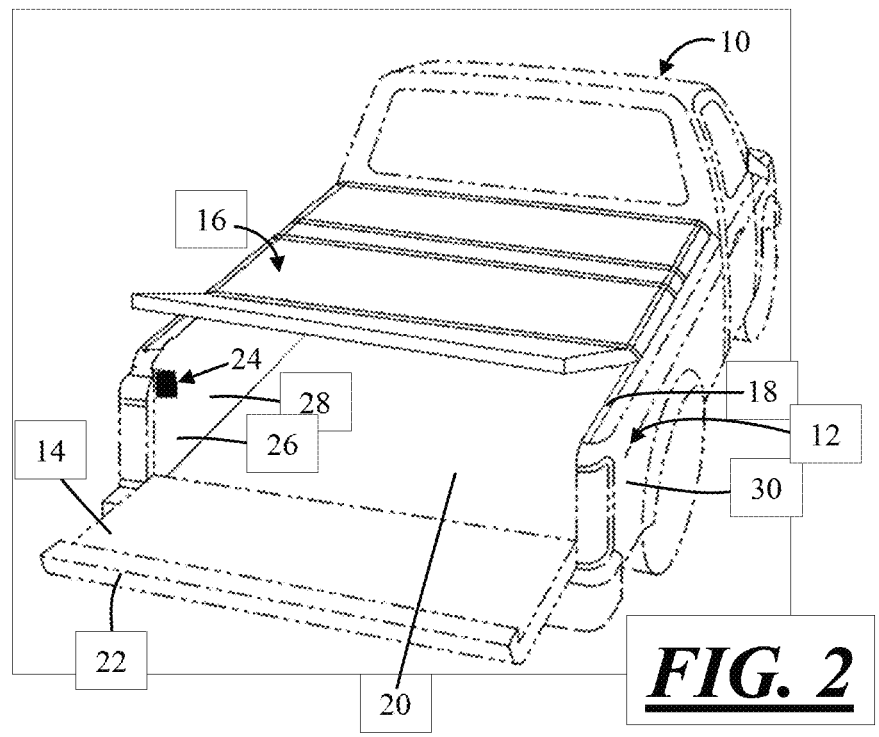
FIG. 2 illustrates a rear perspective view of a vehicle and a tonneau cover having a tailgate of the vehicle and the tonneau cover both in an open position.

FIG. 2 illustrates a rear perspective view of a vehicle 10 having a tailgate 14 in an open or lowered position and a tonneau cover 16 in a partially open or raised position. As shown, the opened or lowered position of the tailgate 14 may be when the tailgate 14 is moved out of a vertical or upright position (e.g., a closed position; see FIG. 1). When the tonneau cover 16 is in the open or raised position, the tonneau cover 16 may be at least partially spaced apart from or out of contact with a top edge 18 of the cargo box 12, a top edge 22 of the tailgate 14, or both.

A striker assembly 24 may be located inside the cargo box 12. The striker assembly 24 may be positioned, contained within, or located inside a fender 26 defining the cargo box 12. Alternatively, or additionally, the striker assembly 24 may be attached to an inside panel 28 of the fender 26 such that the striker assembly 24 may at least partially extend into the inside 20 of the cargo box 12.

While the striker assembly 24 is illustrated in FIG. 2 as being located on only one side of the cargo box 12 and described as being located within the fender 26 or attached to the panel 28 of the fender 26, the striker assembly 24 may also be located within or inside an opposing fender 30 of the cargo box 12, or attached to a panel of the fender 30 of the cargo box 12, or attached to a panel of the fender 30 such that the striker assembly 24 at least partially extends into the inside 20 of the cargo box 12.

It is also envisioned that various configurations may be possible. For example, there may be two or more striker assemblies 24 for a single vehicle 10. One or more striker assemblies 24 may be located within or inside the fender 26 or attached to the panel 28 and/or one or more striker assemblies 24 may be located within or inside fender 30 or attached to a panel thereof.

As will be discussed in more detail below, the striker assembly 24 may be configured to at least partially move, open, raise, pop-open, or separate the tonneau cover 16 away from the top edge 22 of the tailgate 14, away from the top edge 18 of the cargo box 12, or both when the tailgate 14 is opened or lowered, or begins to be lowered or drawn down into the open configuration. For example, when a latch (not shown) of the tailgate 14 of the tailgate 14 is manipulated to unlatch the tailgate 14 and/or when pressure applied on the striker assembly 24 is lowered or reduced compared to when the tailgate 14 is in the closed or vertical position, the striker assembly 24 may be configured to at least partially move, open, raise, pop-open, or separate at least a portion of the tonneau cover 16 away from the top edge 22 of the tailgate 14, away from the top edge 18 of the cargo box 12, or both. Doing so may advantageously reduce or eliminate friction, contact, drag, sticking, or a combination thereof between the tonneau cover 16 and the tailgate 14 while the tailgate 14 is being opened or lowered. Accordingly, this may also beneficially provide for opening or lowering the tailgate 14 with a lower force, prevent scratching or other damage to either or both of the inside surface of the tonneau cover 16 and the tailgate 14, or both.

The striker assembly 24 may also be configured to at least partially move, close, lower, pull-down, or draw the tonneau cover 16 towards or onto the top edge 22 of the tailgate, the top edge 18 of the cargo box 12, or both when the tailgate 14 is closed or raised. For example, as the tailgate 14 begins to be raised or pushed up into the closed position, the striker assembly 24 may at least partially move, close, lower, pull-down, or draw at least a portion of the tonneau cover 16 towards and/or into contact with the top edge 22 of the tailgate 14, the top edge 18 of the cargo box 12, or both. Doing so may advantageously reduce or eliminate friction, contact, drag, sticking, or a combination thereof between the tonneau cover 16 and the tailgate 14 while the tailgate 14 is being closed or raised. Accordingly, this may also beneficially provide for closing or raising the tailgate 14 with a lower force, prevent scratching or other damage to either or both of the inside surface 90 of the tonneau cover 16 and the tailgate 14, or both.

Figure 3A:
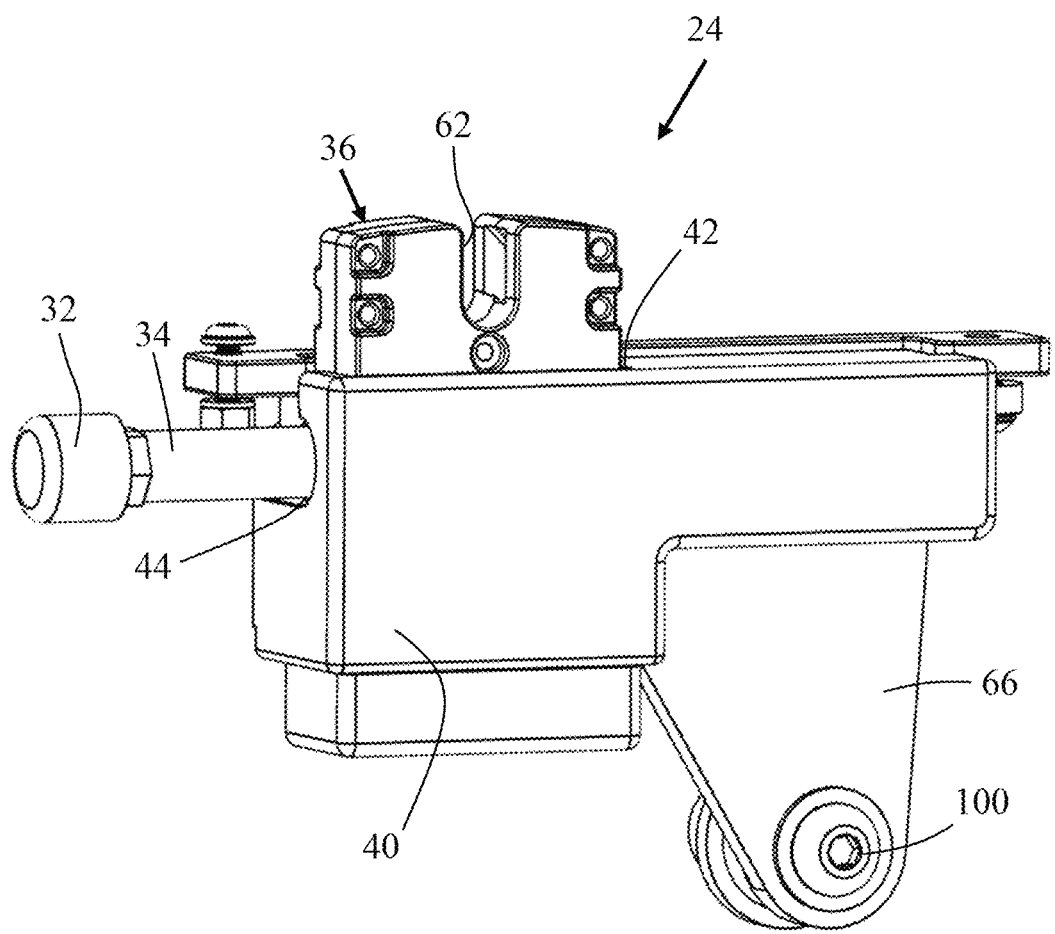
FIG. 3A illustrates a perspective view of a striker assembly.

FIG. 3A illustrates a perspective view of a striker assembly 24. The striker assembly 24 includes a latch 36 at least partially positioned within a cover 40. The latch 36 may be configured to move relative to the cover 40 through an aperture 42 in the cover 40. The latch 36 may move between an open or unlocked position and a closed or locked position when a portion of a tonneau cover is secured within a notch 62 of the latch 36 to move the tonneau cover towards and away from a cargo box of a vehicle (see FIGS. 1 and 2). The latch 36 may be moved by an actuator located within cover 40 or otherwise secured to the striker assembly 24 (see FIGS. 5 and 6). The striker assembly 24 may also include a plunger 32 connected to a shaft 34. The shaft 34 may extend through an aperture 44 and into the cover 40.

The shaft 34 (and thus the plunger 32) may be configured to move within the cover 40. The shaft 34 may be in direct communication with the latch 36 to cause articulation of the latch 36 between the open and closed positions. However, it is envisioned that the shaft 34 may be in indirect communication with the latch 36 to trigger actuation of the latch 36. For example, the shaft 34 may be connected to, or otherwise in communication with, the actuator located within the cover 40. When the plunger 32 and the shaft 34 move away from the actuator, the actuator may receive a signal and actuate the latch 36 to move the latch 36 towards the cover 40 and into a closed or locked position. Similarly, when the plunger 32 and the shaft 34 move towards the actuator, the actuator may receive a similar or different signal and actuate the latch 36 to move the latch 36 away from the cover 40 and into an open or unlocked position (see FIGS. 5A and 5B).

It is contemplated that the shaft 34 and the actuator may directly contact one another or may be free of direct contact. For example, the shaft 34 may abut and directly touch a portion of the actuator to signal the actuator to move the latch 36 into a closed or locked position. When the shaft 34 moves away and is no longer in direct contact with the actuator, the actuator may then move the latch 36 into an open or unlocked position. Conversely, the shaft 34 may be free of contact with the actuator and may send an electrical signal to the actuator that is generated or corresponds to a mechanical movement of the shaft 34. For example, a sensor may be positioned within the cover 40 to measure a movement of the shaft 34 and send a measured value (or resulting calculation) to the actuator.

The striker assembly 24 may also include or be mounted to a bracket 66. The bracket may be configured to mount the striker assembly 24 directly to the vehicle. For example, the striker assembly 24 may be mounted to the bracket 66 and the bracket 66 may then be mounted to a fender or panel defining the cargo box of a vehicle (see FIGS. 1 and 2). The bracket 66 may be secured to the vehicle by one or more fasteners 100 extending through the bracket 66 and into the vehicle. However, it should be noted that any means of securing the striker assembly 24 to the vehicle may be utilized. For example, the striker assembly 24 may be at least partially secured within a stake pocked along a top edge of the cargo box and be free of a cover, bracket or both.

Figure 3B:
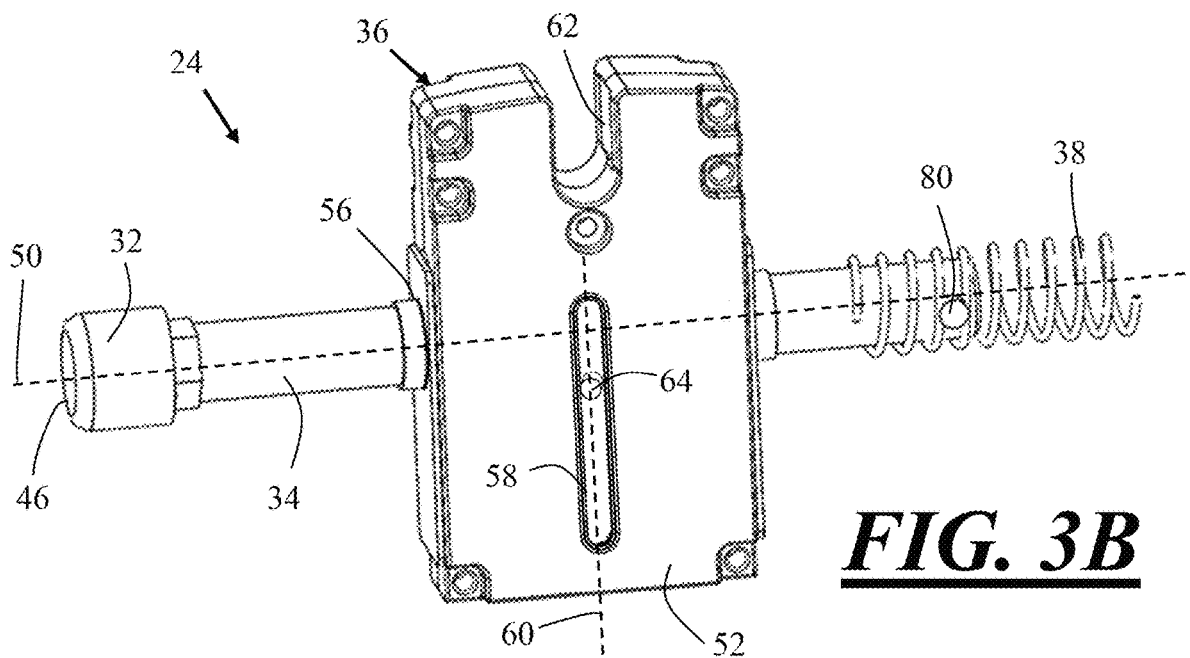
FIG. 3B illustrates a perspective view of a striker assembly having a plunger with the cover removed.

FIG. 3B illustrates a striker assembly 24 with the cover 40 removed. The plunger 32 includes a face 46 upon which a force or pressure can be acted on or removed from for the striker assembly 24 to function, as discussed further below. The shaft 34 may extend along a longitudinal axis 50 into and/or through an opening 56 in a housing 52 of the latch 36. The shaft 34 may extend through an entire width of the latch 36 so that an end of the shaft 34 opposing the plunger 32 protrudes from the housing 52. The opposing end of the shaft 34 may include a retaining pin 80 that engages a spring 38 and maintain contact and/or connection between the shaft 34 and the spring 38. While the shaft 34 is illustrated as being generally cylindrical, the shaft 34 and/or spring 38 may be a different shape, such as square, oval, triangular, etc.

The opposing end of the shaft 34 and/or the spring 38 may be in communication with an actuator (not shown) of the striker assembly 24 so that movement of the shaft 34 signals the actuator to move the latch 36. The actuator may move the latch 36 between an open or unlocked position and a closed or locked position. The latch 36 may be guided along an axis 60 of a slot 58 located within the housing 52 of the latch 36. As shown, the slot 58 (and thus the axis 60 of the slot 58) may be positioned substantially vertical along the latch 36 so that the axis 60 of the slot 58 is substantially perpendicular to the longitudinal axis 50. The latch 36 may be guided along the slot 58 via a guide pin 64 positioned within the housing 52 and extending into the slot 58. The latch 36 may move between the open or unlocked position and the closed or locked position so that a notch 62 of the latch 36 may receive and/or secure a portion of a tonneau cover to move the tonneau cover between the open or unlocked position and the closed or locked position.

The notch 62 may include one or more mechanisms to retain the tonneau cover. For example, the notch 62 may include a movably clasp that moves to receive the tonneau cover and prevents the tonneau cover from disengaging the latch 36. The clasp may then be moved or unlocked based upon articulation of the latch 36, thereby allowing the tonneau cover to be removed from the notch 62.

Figure 3C:
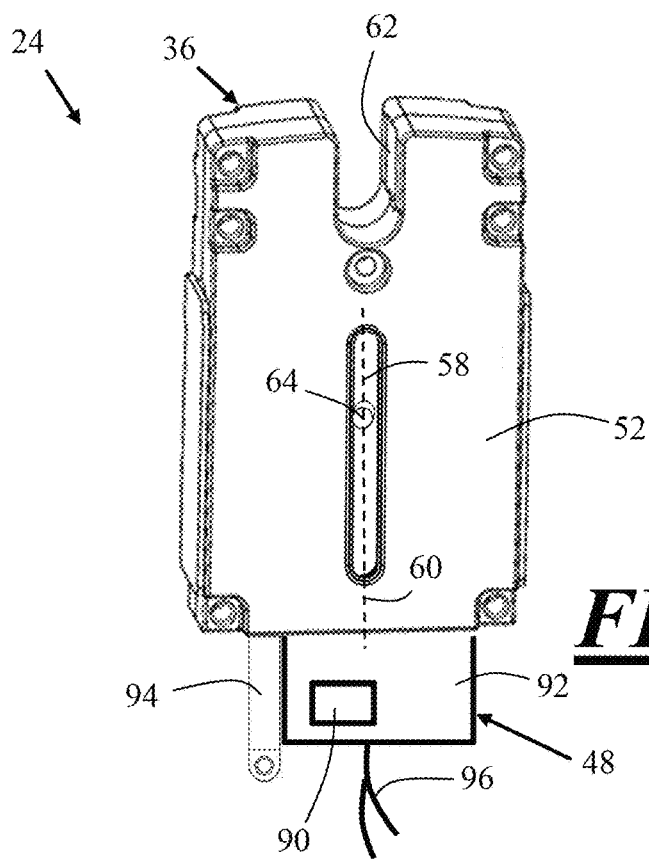
FIG. 3C illustrates a perspective view of a striker assembly having an actuator with the cover removed.

FIG. 3C also illustrates a striker assembly 24 with the cover 40 removed. The striker assembly includes a latch 36 connected to an actuator 48. The actuator 48 may be configured to move the actuator 48 between an open or unlocked position and a closed or locked position. The latch 36 may be guided along an axis 60 of a slot 58 located within a housing 52 of the latch 36. As illustrated, the slot 58 may be positioned substantially vertical along the housing 52 of the latch 36. However, it should be noted that the slot 58 may be positioned in another position other than substantially vertical, such as horizontal or at an angle.

The latch 36 may be connected to an armature 94 of the actuator 48. The actuator 48 may also include a receiver 90 located within a housing 92. When a wireless signal is received by the receiver 90, the actuator 48 may trigger actuation of the armature, thereby moving the latch 36 between an open or unlocked position and a closed or locked position. It should be noted that that actuator may also be configured to incrementally actuate the latch 36 to one or more positions between the open or unlocked position and the closed or locked position. As illustrated, the actuator 48 may receive power through wiring 96 extending into the housing 92 of the actuator 48. The wiring 96 may be connected to an external power source, such as a wire harness connected to a battery of the vehicle.

Figure 4:
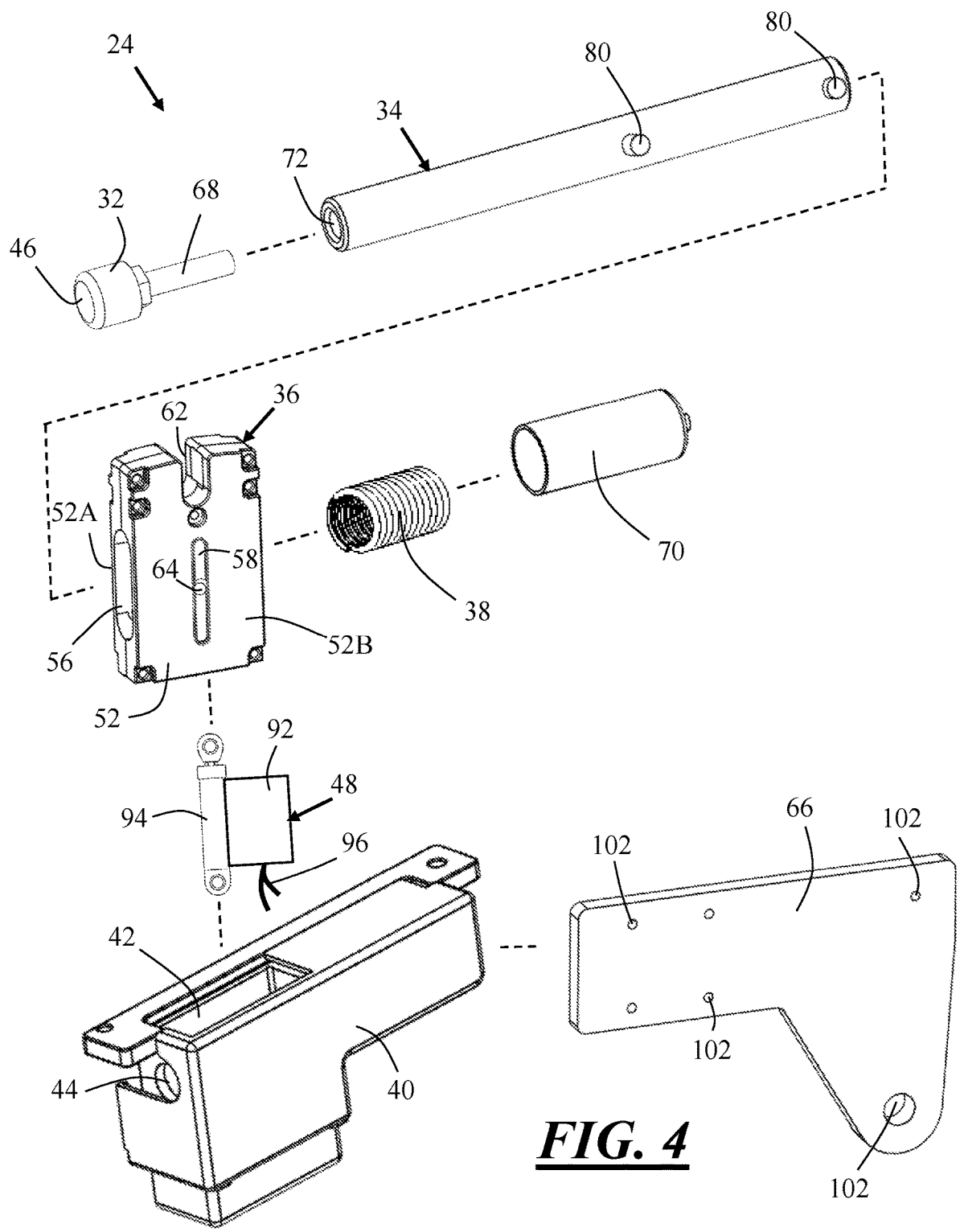
FIG. 4 illustrates an exploded view of a striker assembly.

FIG. 4 illustrates an exploded view of a striker assembly 24. The striker assembly 24 includes a latch 36 at least partially positioned within a cover 40. The latch 36 may be configured to move relative to the cover 40 through an aperture 42 in the cover 40. The latch 36 may move between an open or unlocked position and a closed or locked position. The latch 36 may also move a tonneau cover when a portion of the tonneau cover is secured within a notch 62 of the latch 36 (see FIGS. 1 and 2).

The latch 36 may be connected to an armature 94 of an actuator 48. The actuator 48 may be configured to actuate the latch 36 by moving the armature 94 based on power received via wiring 96 extending into a housing 92 of the actuator 48.

The striker assembly 24 may also include a plunger 32 connected to a shaft 34. The plunger 32 may include a rod 68 that is received in a bore 72 of the shaft 34 to secure the plunger 32 to the shaft 34. The rod 68 may include threading so that the rod 68 may be threaded into the bore 72 (i.e., the threading of the rod 68 mates with threading inside the bore 72). The plunger 32 further includes a face 46 configured to receive a force applied to the plunger 32 to move the plunger 32 and the shaft 34. The shaft 34 may extend through an opening 56 within a housing 52 of the latch 36 so that a portion of the shaft 34 protrudes from opposing sides of the latch 36. The opening 56 of the housing 52 may be formed between opposing walls (52A, 52B) of the housing 52.

The shaft 34 may include retaining pins 80 to maintain a position of a spring 38 and connect the shaft 34 to a spring 38 partially encompassing the shaft 33. The spring 38 may be housed within a casing 70 to protect the spring 38 from degradation due to moisture, debris, other contaminants, or a combination thereof.

The shaft 34 may extend through an aperture 44 of the housing 40 and through the latch 36 so that the shaft 34 may communicate with the actuator 48. For example, movement of the shaft 34 based on a force applied to the face 46 of the plunger 32 or movement of the spring 38 may send a signal to the actuator 48 so that the actuator 48 moves the latch 36 (see FIGS. 5A and 5B). Based upon actuation, the latch 36 may be guided along an axis 60 of a slot 58 located within the walls (52A, 52B), of the housing 52. The latch 36 may be guided along the slot 58 via a guide pin 64 positioned within the housing 52 and extending into the slot 58. The latch 36 may move between an open or unlocked position and an closed or locked position so that a notch 62 of the latch 36 may receive and/or secure a portion of a tonneau cover to move the tonneau cover between the open or unlocked position and the closed or locked position.

The striker assembly 24 may also include or be mounted to a bracket 66. The bracket may be configured to mount the striker assembly 24 directly to the vehicle. For example, the striker assembly 24 may be mounted to the bracket 66 using mounting holes 102 of the bracket 66 and fasteners. Similarly, the bracket 66 may then be mounted to a fender or panel defining the cargo box of a vehicle (see FIGS. 1 and 2). The bracket 66 may be secured to the vehicle by one or more fasteners 100 extending through one or more mounting holes 102 of the bracket 66 and into the vehicle.

Figure 5A:
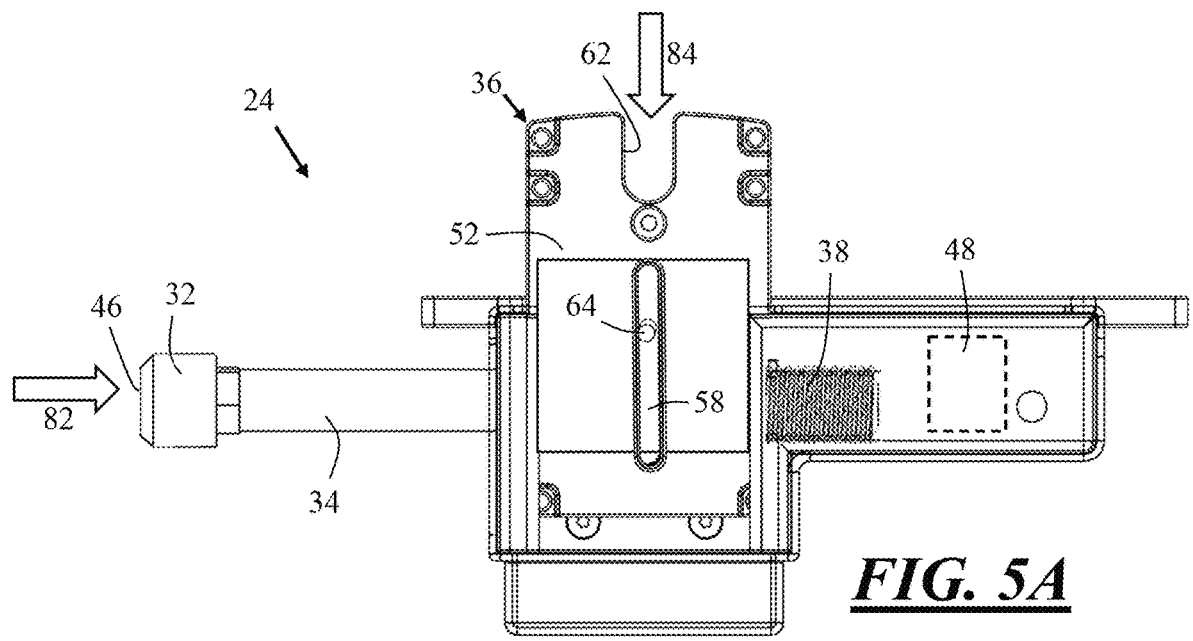
FIG. 5A illustrates a side view of a striker assembly in an open or unlocked position.
Figure 5B:
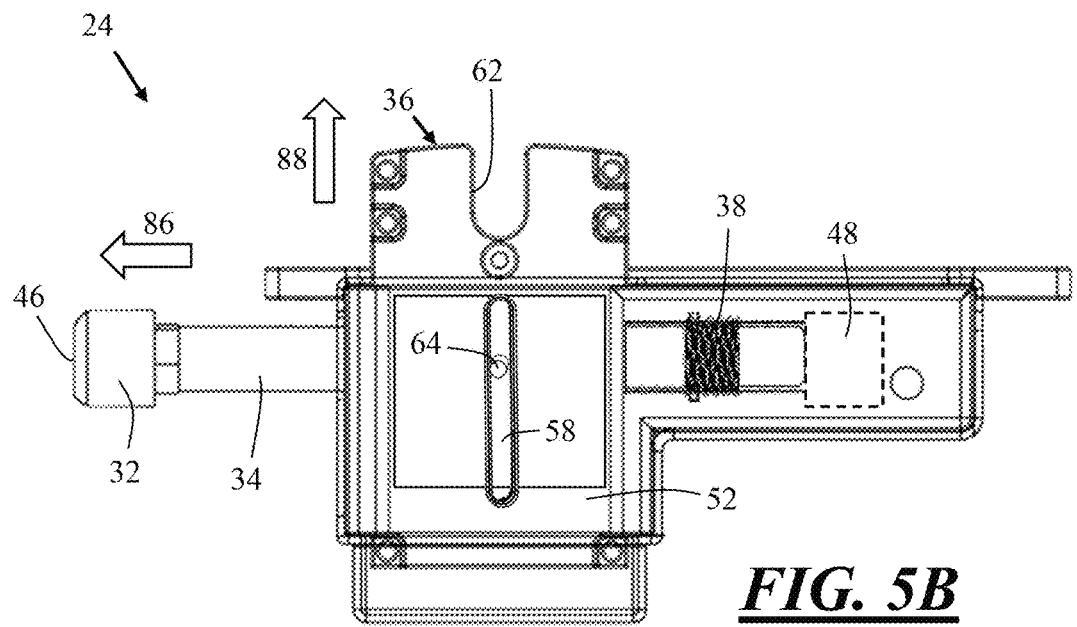
FIG. 5B illustrates a side view of a striker assembly in a closed or locked position.

FIG. 5A illustrates a side view of a striker assembly 24 in an open or unlocked position and FIG. 5B illustrates a side view of the striker assembly 24 in a closed or locked position. The open or unlocked position corresponds to the tonneau cover being in an at least partially open or raised configuration (see, e.g., FIG. 2). The closed or locked position corresponds to the tonneau cover being in a closed or lowered position (see, e.g., FIG. 1).

As shown in FIGS. 5A and 5B, the striker assembly 24 includes a latch 36 at least partially positioned within a cover. For simplicity, the cover has been omitted from the figures. The latch 36 may move between an open or unlocked positioned and a closed or locked position when a portion of a tonneau cover is secured within a notch 62 of the latch 36 to move the tonneau cover towards and away from a cargo box of a vehicle (see FIGS. 1 and 2). It should be noted that the latch 36 may also move when the tonneau cover is not secured within the notch 62 of the latch 36. The latch 36 may be moved by an actuator 48 connected to the latch 36. The striker assembly 24 may also include a plunger 32 connected to a shaft 34.

The shaft 34 (and thus the plunger 32) may be configured to move. As illustrated, the shaft 34 may be connected to, or otherwise in communication with, the actuator 48. As shown in FIG. 5A, when a force is applied to a face 46 of the plunger 32 and the shaft 34 move towards the actuator 48 in a first direction 82, the actuator 48 may receive a signal and actuate the latch 36 to move the latch 36 away from the cover (not shown) in a second direction 84 and into an open or unlocked position. As the shaft 34 moves towards the actuator 48, a spring 38 connected to the shaft 34 is compressed and may be held in tension until the plunger 32 and the shaft 34 are desired to be released. Similarly, as shown in FIG. 5B, when the plunger 32 and the shaft 34 move away from the actuator 48 based on decompression of the spring 38 in a third direction 86, the actuator 48 may receive a similar or different signal and actuate the latch 36 to move the latch 36 away from the cover (not shown) and into an open or unlocked position. As shown, the shaft 34 may directly contact the actuator 48 to trigger the actuator 48 to move the latch 36.

The latch 38 may be guided along a slot 58 located within a housing 52 of the latch 36. As shown, the slot 58 may be positioned may be positioned substantially vertical along the housing 52 so that a direction of movement (84, 88) of the latch 36 is substantially perpendicular to a direction of movement (82, 86) of the plunger 32 and the shaft 34. The latch 36 may be guided along the slot 58 via a guide pin 64 positioned within the housing 52 and extending into the slot 58. The latch 36 may move between the open or unlocked position (FIG. 5A) and the closed or locked position (FIG. 5B) so that a notch 62 of the latch 36 may receive and/or secure a portion of a tonneau cover to move the tonneau cover between the open or unlocked position and the closed or locked position.

Figure 6A:
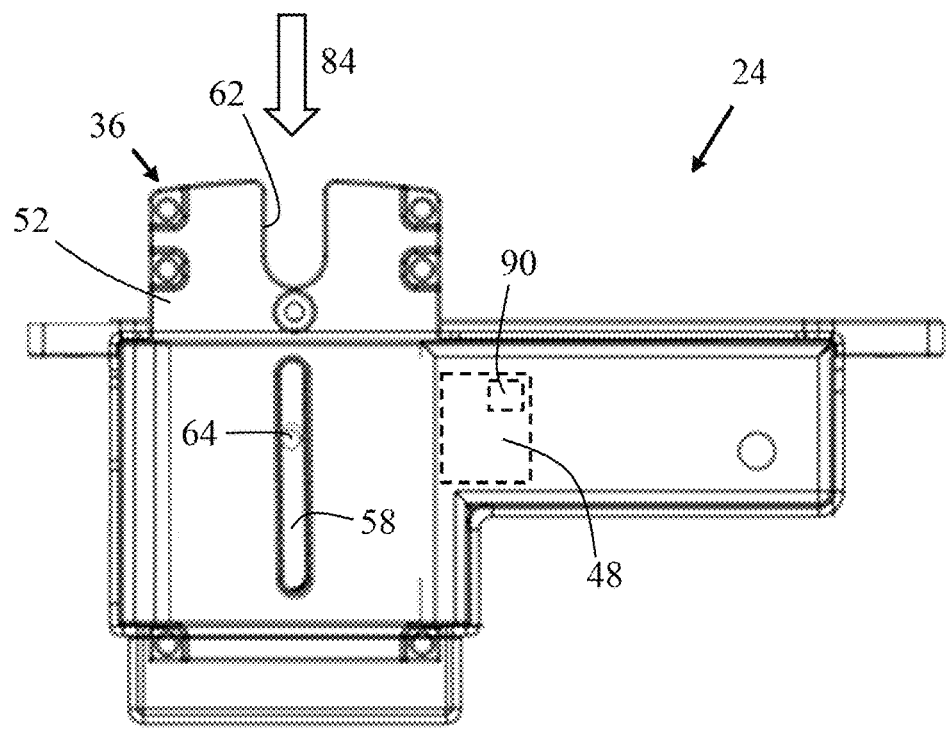
FIG. 6A illustrates a side view of a striker assembly without a plunger in an open or unlocked position.
Figure 6B:
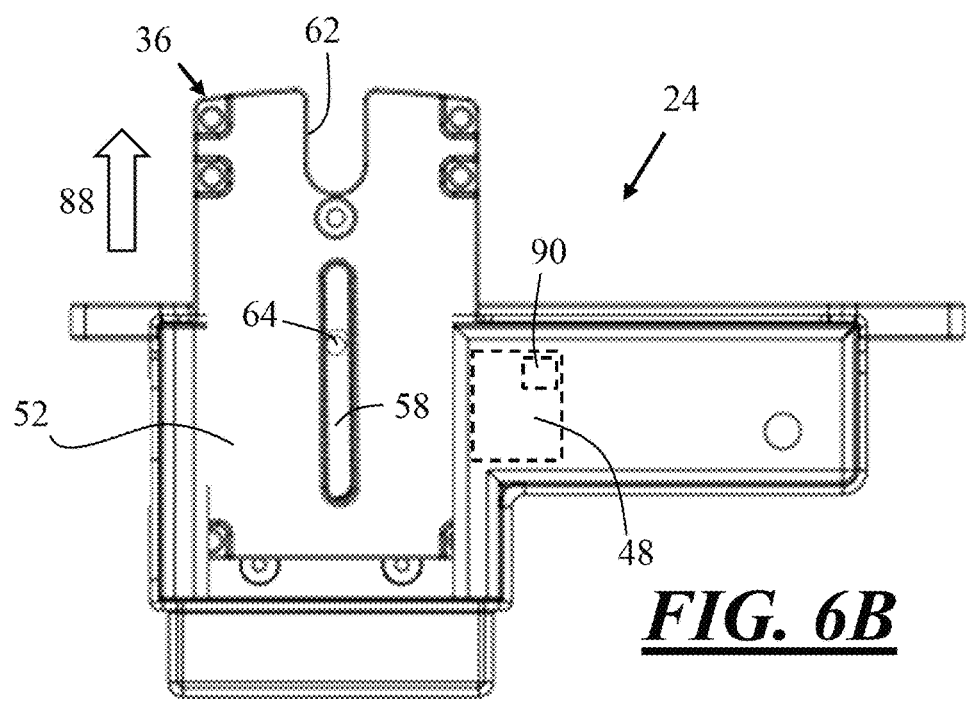
FIG. 6B illustrates a side view of a striker assembly without a plunger in a closed or locked position.

FIG. 6A illustrates a side view of a striker assembly 24 in an open or unlocked position and FIG. 6B illustrates a side view of the striker assembly 24 in a closed or locked position. The open or unlocked position corresponds to the tonneau cover being in an at least partially open or raised configuration (see, e.g., FIG. 2). The closed or locked position corresponds to the tonneau cover being in a closed or lowered position (see, e.g., FIG. 1).

In comparison to FIGS. 5A and 5B, the striker assembly 24 of FIGS. 6A and 6B does not include a plunger or a shaft. As such, it is envisioned that the striker assembly 24 may be configured to move a latch 36 of the striker assembly 24 free of physical interaction with the striker assembly 24. The latch 36 may be connected to an actuator 48 so that the actuator 48 may move the latch between the open or unlocked position and the closed or locked position. The latch 36 may be guided along a slot 58 in a housing 52 of the latch 36 by a guide pin 64 positioned within the slot 58.

As shown in FIG. 6A, a receiver 90 of the actuator 48 may receive a signal that triggers the actuator 48 to move the latch 36 in a second direction 84 to a closed or locked position. Similarly, as shown in FIG. 6B, the receiver 90 of the actuator 48 may receive a similar or different signal that triggers the actuator 48 to move the latch 36 in a fourth direction 88 to an open or unlocked position. The signal may be transmitted wirelessly via a fob, cellular device, remote, other electronic device, or a combination thereof. The signal may be transmitted to directly communicate with the actuator 48, indirectly communicate with the actuator 48, or both. For example, the signal may be received directly from an external device configured to control the actuator 48. However, the signal may also be received by the actuator 48 by indirectly reading a signal from an external device that controls a tailgate or other secondary component of a vehicle. Alternatively, the signal may be received from wiring connected between the receiver 90 and a secondary user input, such as a button, switch, sensor, other input, or a combination thereof. For example, a capacitive touch sensor along an exterior of the cargo box of a vehicle may be touched by an operator, which in turn may send a signal wirelessly or through wiring to the receiver 90 in the actuator 48, thereby triggering actuation of the latch 36. The latch 36 may move between the open or unlocked position (FIG. 5A) and the closed or locked position (FIG. 5B) so that a notch 62 of the latch 36 may receive and/or secure a portion of a tonneau cover to move the tonneau cover between the open or unlocked position and the closed or locked position.

Figure 7:
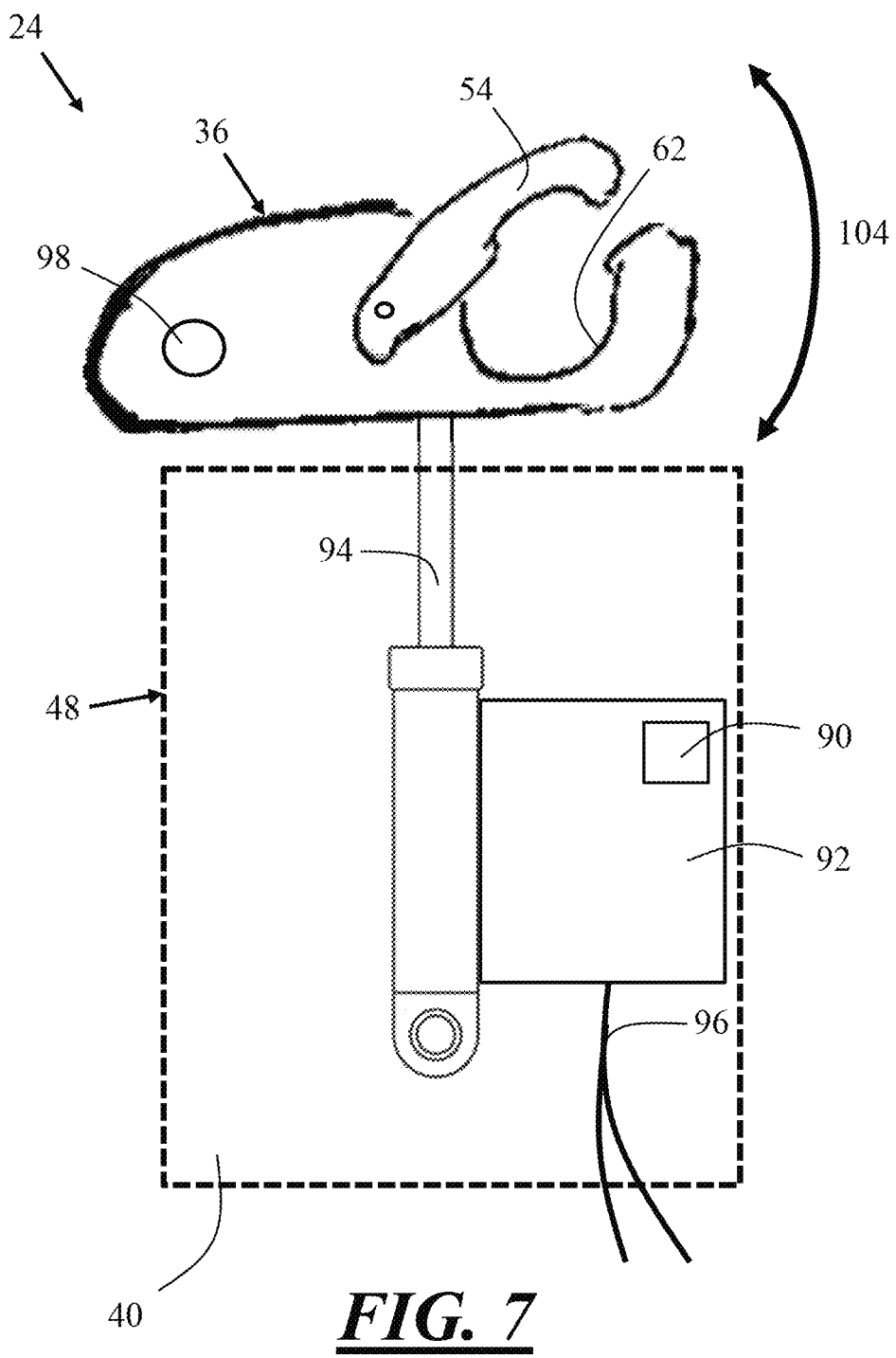
FIG. 7 illustrates a side view of a strike assembly.

FIG. 7 illustrates a side view of a striker assembly 24. The striker assembly 24 includes a latch 36 in communication with an actuator 48 housed within a cover 40. The actuator 48 may include an armature 94 extending out of the cover 40 and connected to the latch 36. The actuator 48 may receive power through wiring 96 extending into a housing 92 of the actuator 48 to move the armature 94. A signal may be transmitted to a receiver 90 of the actuator 48 to trigger movement of the armature 94, thereby articulating the latch 36 between an open or unlocked position (see FIG. 2) and closed or locked position (see FIG. 1). During articulation, the latch 36 may move about a pivot axis 98. The latch 36 may move in a pivot direction 104 towards the cover 40 to a closed or locked position. Similarly, the latch 36 may move in an opposing pivot direction 104 away from the cover 40 to an open or unlocked position. The latch 36 may be secured near or at the pivot axis 98 to movably secure the latch 36 for articulation. The latch 36 may be secure to any portion of the striker assembly 24 such as the cover 40, a bracket of the striker assembly 24, other portion of the striker assembly 24, or a combination thereof. Alternatively, the latch 24 may be secured to a portion of a vehicle, such as a fender or panel of the cargo box.

The latch 36 may move between the open or unlocked position and the closed or locked position so that a notch 62 of the latch 36 may receive and/or secure a portion of a tonneau cover to move the tonneau cover between the open or unlocked position and the closed or locked position. The notch 62 may include a clasp 54 pivotally engaged to the latch 36. The clasp 54 may be configured to move to receive the tonneau cover and prevent the tonneau cover from disengaging the latch 36. The clasp 54 may then be moved or unlocked based upon articulation of the latch 36 or other triggering event, thereby allowing the tonneau cover to be removed from the notch 62.

Figure 8:
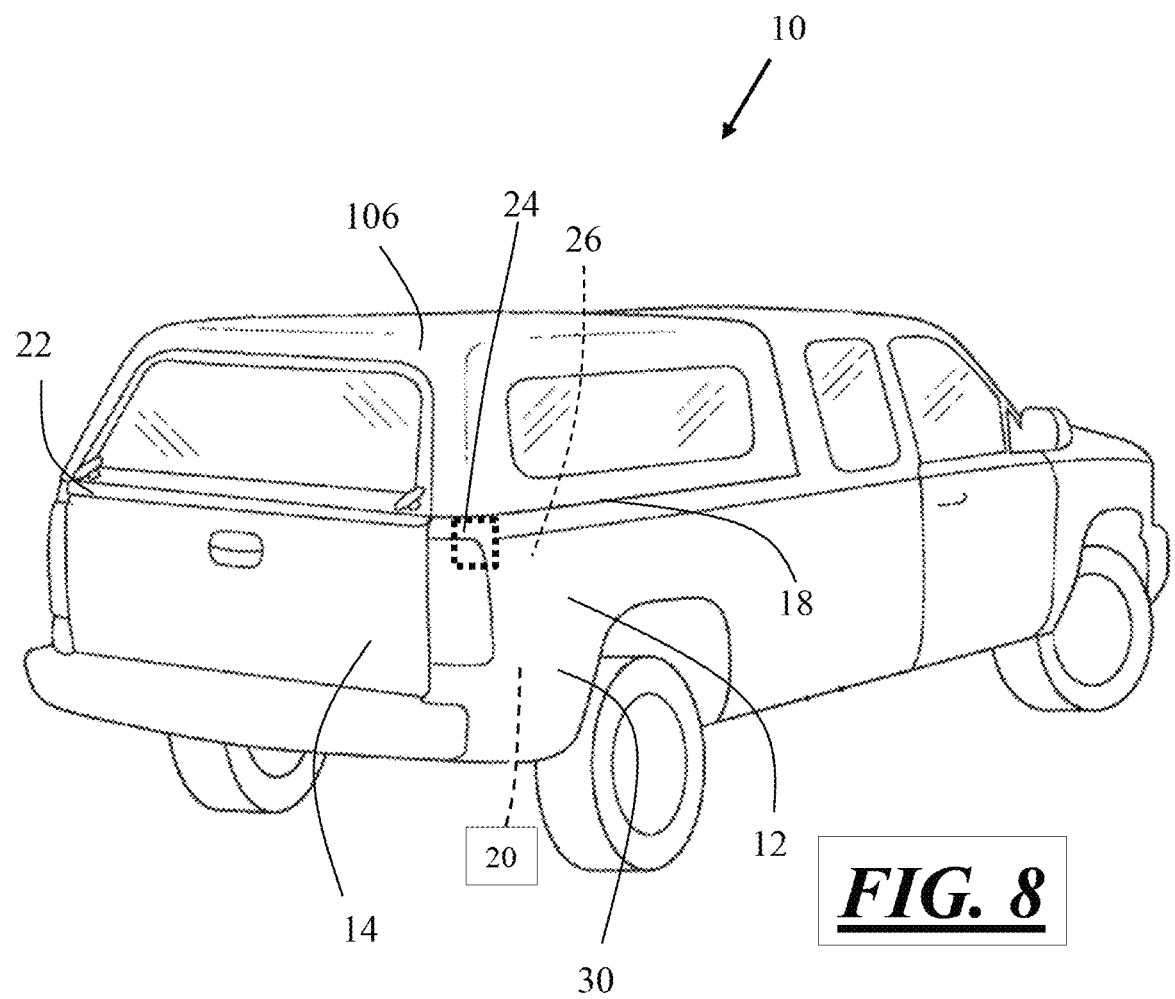
FIG. 8 illustrates a rear perspective view of a vehicle and a bed cap having a tailgate of the vehicle and the bed cap both in a closed position.

FIG. 8 illustrates a perspective view of a vehicle 10. The vehicle 10 comprises a cargo box 12 and a tailgate 14. As shown, the tailgate 14 is in a closed or raised position, where the tailgate 14 is at or near a vertical, upright position relative to the ground. The vehicle 10 shown may be similar to, or have a different structure from, the vehicle shown in FIGS. 1 and 2. While FIGS. 1 and 2 illustrate a tonneau cover disposed on the cargo box 12, the vehicle shown here illustrates a truck cap 106 secured along an upper portion of the cargo box 12. The truck cap 106 may be supported by a top edge of the cargo box 18, a top edge of the tailgate 22, or both. Thus, the truck cap 106 may at least partially enclose an inside 20 of the cargo box 12. The truck cap 106 may protect against dirt, debris, water, other contaminants, or a combination thereof from entering the inside 20 of the cargo box 12. While the truck cap 106 is shown in a closed or lowered position substantially supported by the cargo box 12, the truck cap 106 may be adapted to move to an open or raised position to allow for the tailgate 22 to more freely move between the closed or upright position and an open or lowered position. Therefore, it is envisioned that one or more striker assemblies 24 as described herein may be secured to a portion of the vehicle 10 to actuate the truck cap 106 between the closed or lowered position and the open or raised position. The striker assemblies 24 may be mounted to an inner fender 26 defining a portion of the cargo box 12 (see FIG. 2). Alternatively, the striker assemblies 24 may be mounted to an outer fender 30, the tailgate 14, the truck cap 106, or a combination thereof.

Thus, the striker assembles 24 may operate in a similar manner to those utilized to actuate a tonneau cover as shown in FIGS. 1 and 2. However, the striker assemblies 24 may also operate in a different manner unique to the truck cap 106 if desired. For example, the striker assemblies 24 actuate a portion of the striker assemblies 24 (e.g., a latch) in a different direction when compared to the striker assemblies 24 used for a tonneau cover. Additionally, a greater number of striker assemblies 24 may be needed to lift a weight of the truck cap 106 in comparison to a tonneau cover, or vice versa.

Figure 9A:
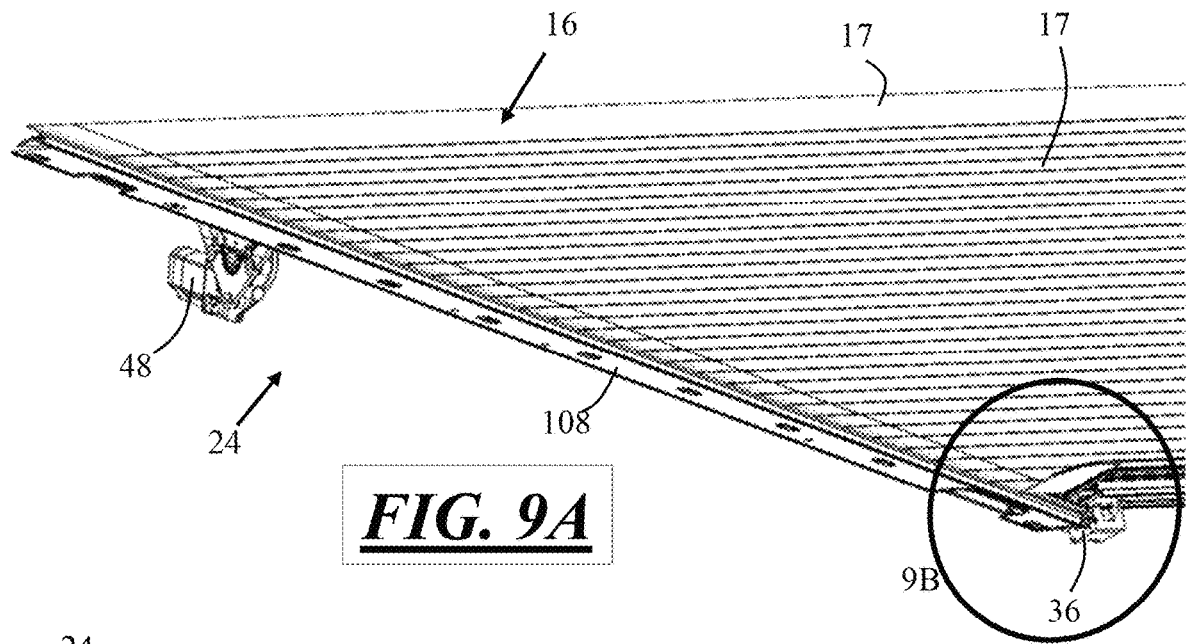
FIG. 9A illustrates a perspective view of a tonneau cover in communication with a striker assembly.

FIG. 9A illustrates a perspective view of a striker assembly 24 in communication with a tonneau cover 16. The tonneau cover 16 includes a plurality of interconnected panels 17. While the tonneau cover 16 is shown as a substantially hard and/or rigid cover, the tonneau cover 16 may also be flexible and/or a soft-top. The tonneau cover 16 may be configured to fold upon itself, roll upon itself, or both to expose a portion of a cargo box of a vehicle (see FIG. 1). The tonneau cover 16 may be disposed across opposing sides of a cargo box to cover the cargo box, protect items within the cargo box, or both. The tonneau cover 16 may be secured to the cargo box by one or more side rails extending along sides of the tonneau cover 16. The side rails 108 may be secured to the cargo box, integrally formed with a portion of the cargo box, or both.

A striker assembly 24 may also be secured to at least one of the side rails 108 and may be configured to articulate at least a portion of the tonneau cover 16 between an open and closed position. The striker assembly may include an actuator 48 connected to a latch 36 so that the latch 36 may be articulated by the actuator 48 to open and close the tonneau cover 16. As illustrated, the tonneau cover 16 is in an open position in which at least a portion of the panels 17 are folded partially upwards relative to the tonneau cover 16 by the latch 36. It should be noted that the actuator 48 and the latch 36 may be positioned anywhere along the tonneau cover 16 based upon which portion of the tonneau cover 16 is desired to move.

Figure 9B:
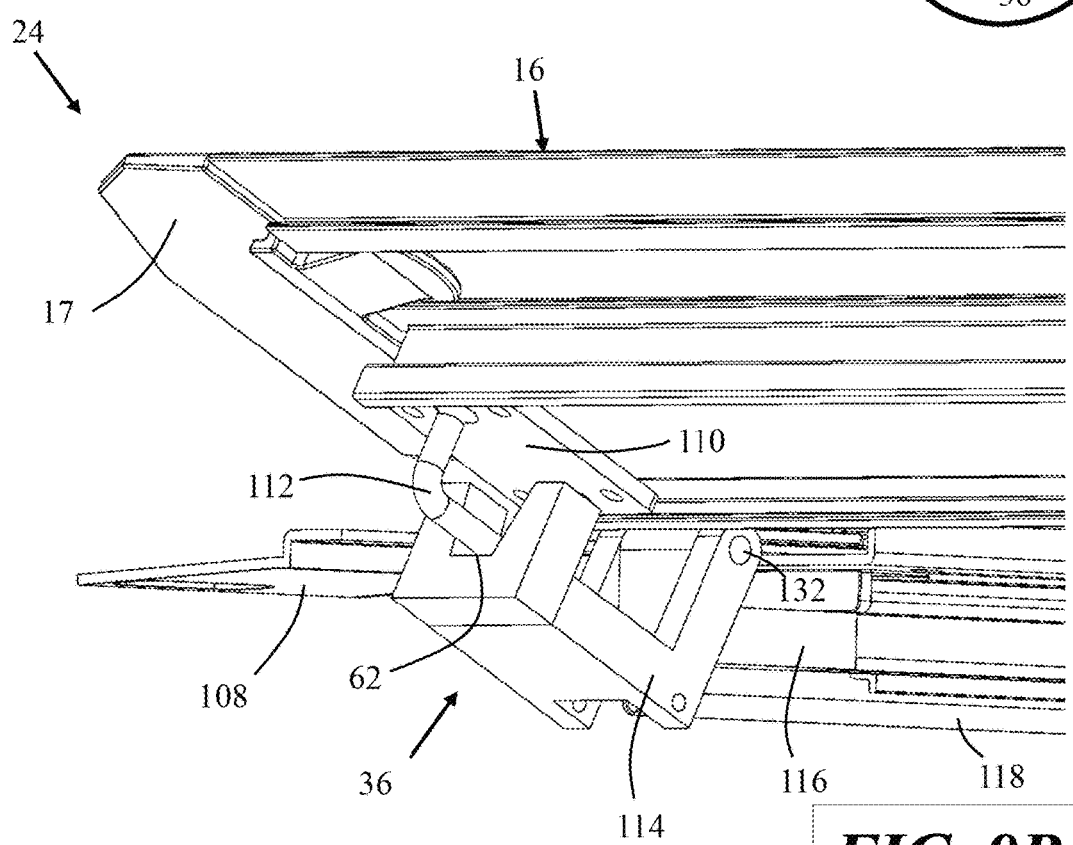
FIG. 9B illustrates a close-up perspective view of FIG. 9A.

To provide further detail, FIG. 9B is a close-up perspective view of the latch 36 of the striker assembly 24 shown in FIG. 9A. The latch 36 includes a hinge 114 pivotally engaged to a base 116. The base 116 is secured within a channel of the side rail 108 to maintain a position of the latch 36 during actuation. The hinge 114 may pivot about a latch pin 132 connecting the hinge 114 to the base 116. The hinge 114 may include a notch 62 that engages a striker plate 110 positioned within, or secured to, a member of a panel 17 of the tonneau cover 16. The notch 62 may engage a ring 112 of the striker plate 110 to movably secure the panel 17 to the latch 36.

As illustrated in FIG. 9B, the tonneau cover 16 is in an open position in which the panel 17 is extended upwardly relative to the tonneau cover 16. To move the panel 17 downward and place the tonneau cover 16 in a closed position, the actuator may receive a signal to actuate the latch 36. Upon actuation, linkage 118 connecting the actuator to the latch 34 may pivot the hinge 114, thereby moving the panel 17 connected to the hinge 114. It should be noted that connection between the panel 17 and the latch 114 may be maintained before, during, and after actuation (i.e., before, during, after, or a combination thereof during movement between the open and the closed positions). Therefore, it is envisioned that upon moving the tonneau cover 16 to an open position, a secondary operation or signal may release the ring 112 from the notch 62, thereby allowing disconnection of the panel 17 from the latch 36. However, it should be noted that connection and/or disconnection between the panel 17 and the latch 36 may be configured for any desired point during the operation. For example, the disconnection between the panel 17 and the latch 36 may happen simultaneously when moving the panel 17 from the closed position to the open position.

Figure 10:
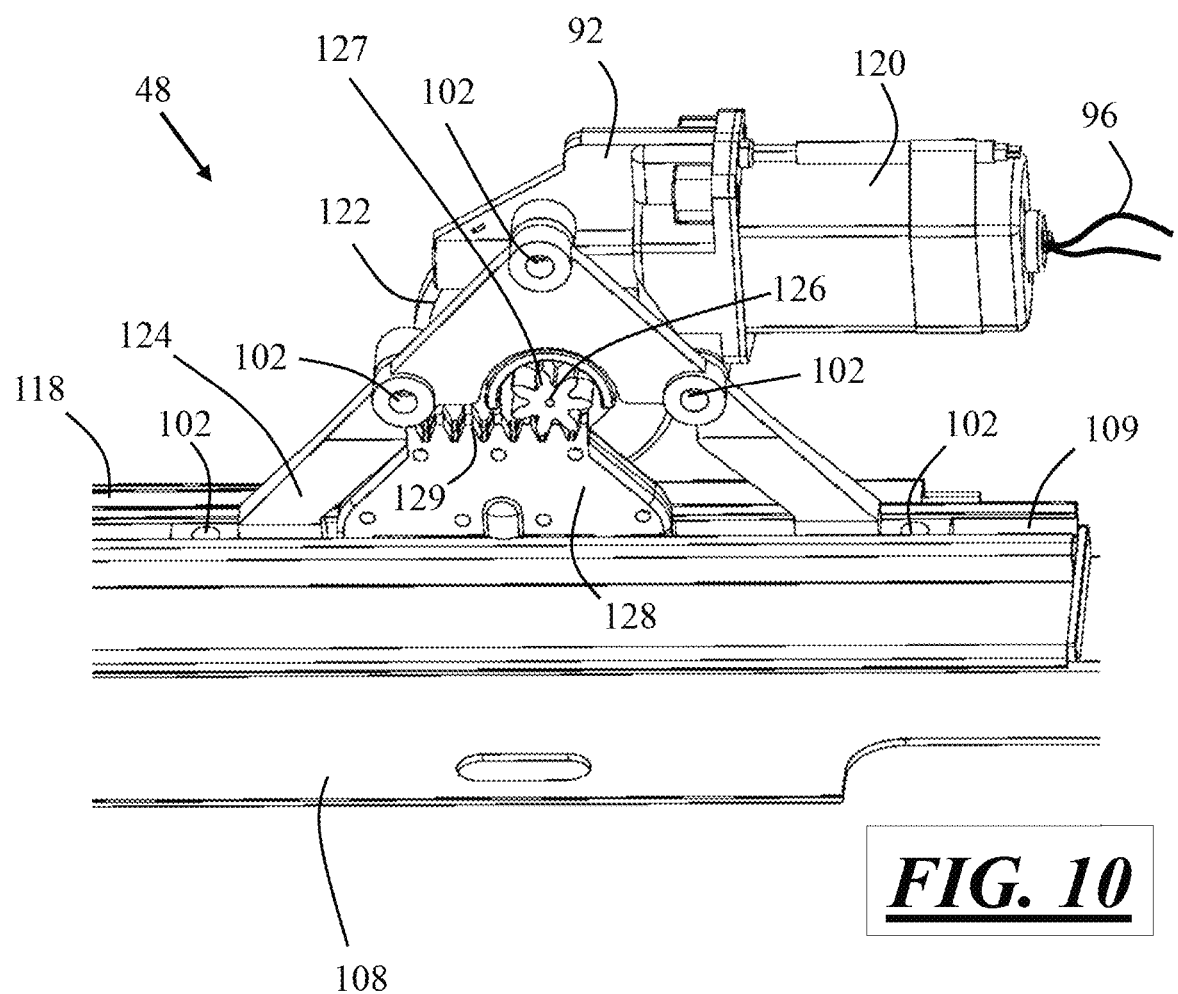
FIG. 10 illustrates a perspective view of an actuator of a striker assembly secured to a side rail of a cargo box.

FIG. 10 illustrates a bottom perspective view of an actuator 48 of a striker assembly. The actuator 48 includes a motor 120 connected to a power source of a vehicle via wiring 96. The motor 120 is secured within an actuator housing 92 and is in communication with a pinion 126. The actuator 48 may be fixedly secured within a channel 109 of a side rail 108 via an actuator bracket 124. However, it should also be noted that the actuator 48 may also be placed or attached to a portion of a cargo box other than within the channel 109. As shown, the actuator bracket 124 may include a plurality of mounting holes 102 that receive a fastener when positioned within the channel 109 to secure the actuator bracket 124 within the channel 109. It is envisioned that the actuator bracket 124 may be positioned anywhere within the channel 109 of the side rail 108 to move a desired portion of a tonneau cover or another accessory.

During operation, the motor 120 may rotate the pinion 126 via a gearbox 122 connecting the motor 120 to the pinion 126. The pinion 126 may then drive a gear rack 128 movably secured within the channel 109. When the pinion 126 is rotated, teeth 127 of the pinion 126 communicate with teeth 129 of the gear rack 128 to translate a substantially rotational movement of the pinion 126 to a substantially linear movement of the gear rack 128. The gear rack 128 may also be connected to linkage 118 secured to a latch. When the gear rack 128 moves, the linkage 118 also moves, thereby articulating the latch between an open and closed position (see FIGS. 11A and 11B). It should be noted that the gear rack 128 may be positioned between opposing connecting points of the actuator bracket 124 to contain movement of the gear rack 128 during operation.

While a motor 120, gear rack 128, and pinion 126 are illustrated, it is also envisioned that one or more additional components or configurations may be possible. For example, the motor 120, the gear rack 128, and the pinion 126 may be replace by a linear actuator that directly articulates (e.g., pulls) the linkage 118. Additionally, the motor 120 may be positioned at any desired angle relative to the gear rack 128, the pinion 126, the latch, or a combination thereof. The motor 120 may be positioned in-line with the linkage 118 and the latch or may be positioned in a non-linear manner.

Figure 11A:
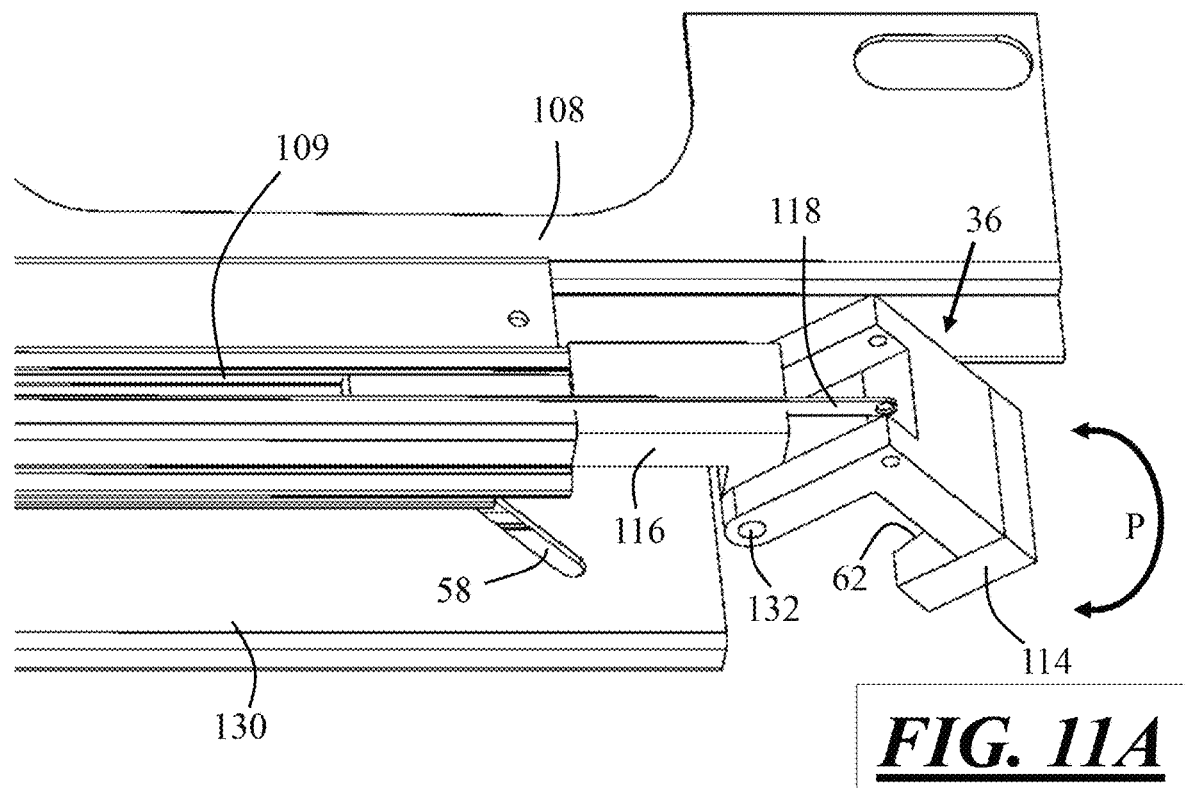
FIG. 11A illustrates a perspective view of a latch of a striker assembly in an open position.

FIG. 11A illustrates a perspective view of a latch 36 in communication with an actuator of a striker assembly. As illustrated, the latch 36 is in an open position in which the latch 36 may at least partially open a tonneau cover or another accessory. The latch 36 may include a hinge 114 pivotally engaged to a base 116 by a latch pin 132. The base 116 may be secured within a channel 109 of the side rail 108 to maintain a position of the latch 36 during operation. For example, the latch 36 may be secured in a desired position along the channel 109 so that a notch 62 of the hinge 114 aligns with a striker plate or other portion of the tonneau cover. The hinge 114 may be connected to the actuator by linkage 118 so that, when the actuator drives the linkage 118, the hinge 114 in turn moves to the open position in a pivot direction (P), thereby at least partially opening the tonneau cover or another accessory. The linkage 119 may be secured to the hinge 114 by one or more pins (not shown). During articulation, a rail lock 130 may also be guided along a plurality of slots 58 to an unlocked position. It is envisioned that the rail lock 130 is in an unlocked position when the latch 36 is in an open position so that one or more panels of the tonneau cover may be opened without interference by the rail lock 130. However, it should be noted that the rail lock 130 may operate in any desired manner relative to the articulation of the latch 36.

Figure 11B:
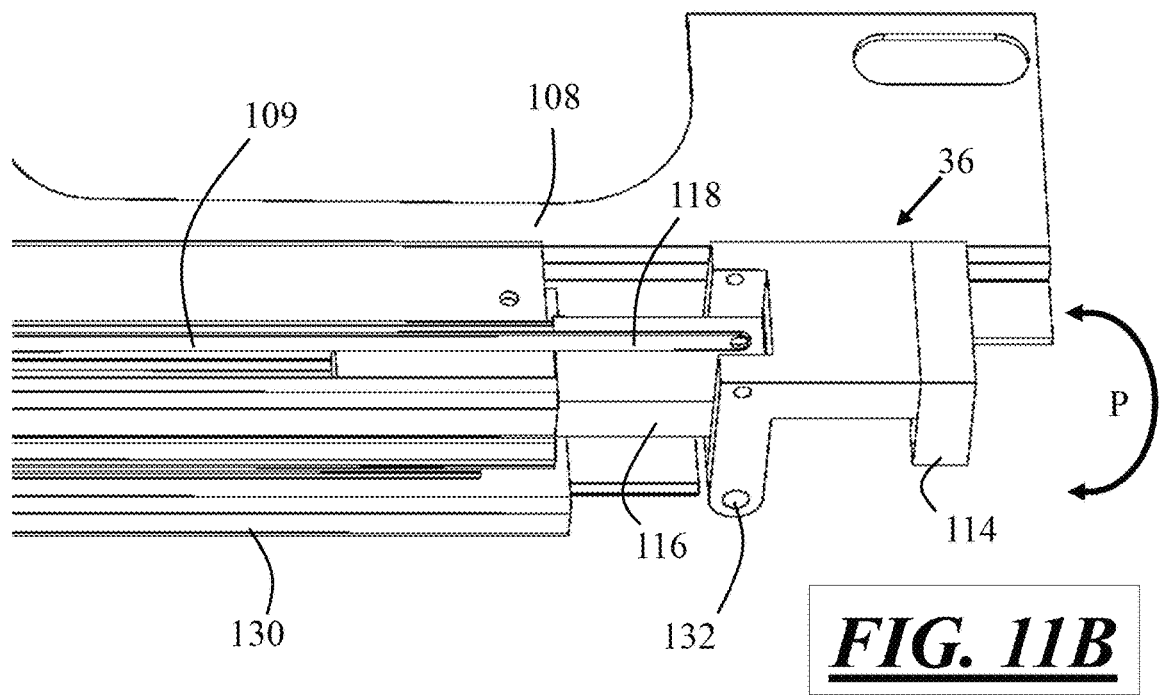
FIG. 11B illustrates a perspective view of the latch of FIG. 11B in a closed position.

Similarly, FIG. 11B illustrates the latch 36 of FIG. 11A in a closed position. In the closed position, the tonneau cover or another accessory may also be in a closed position to prevent access to the cargo box of the vehicle. The actuator may move the linkage 118 to articulate the hinge 114 of the latch 36 between the open and closed positions in the pivot direction (P). It should also be noted that the hinge 114 may move to one or more additional positions between the open and the closed positioned.

Figure 12:
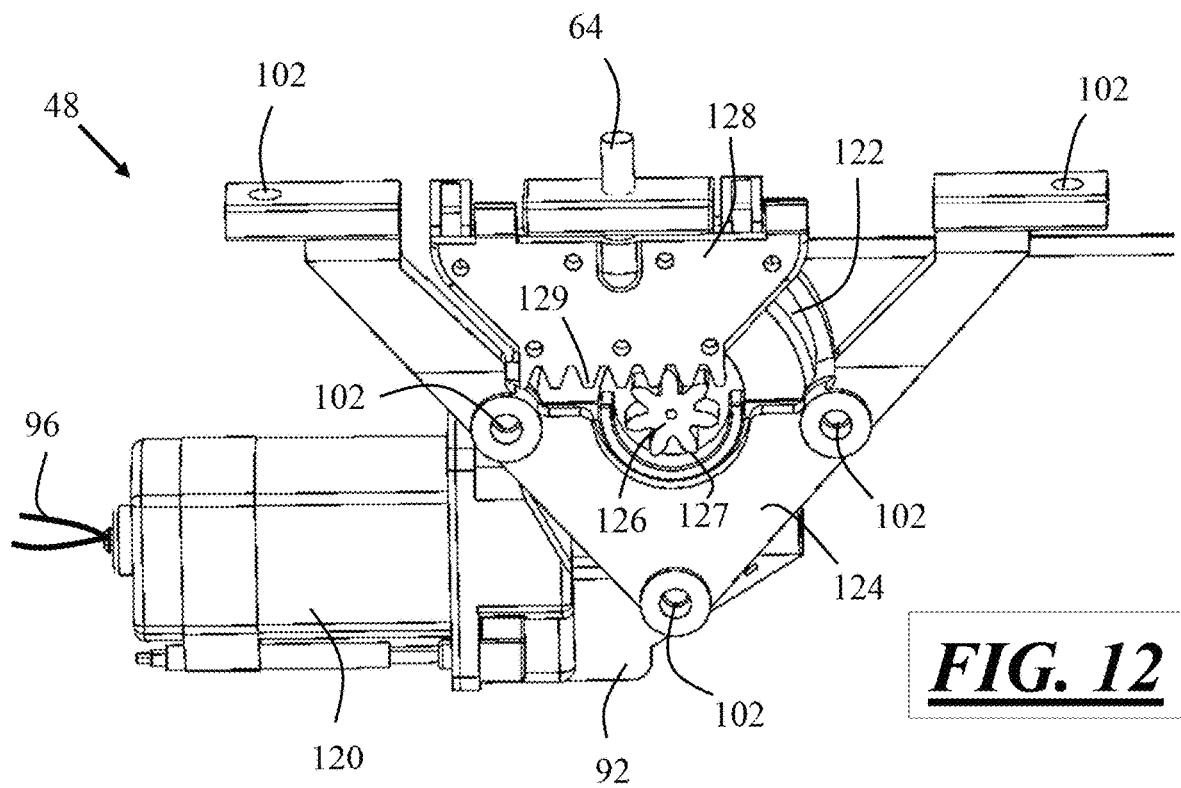
FIG. 12 illustrates a side view of an actuator of a striker assembly.

FIG. 12 illustrates a side view of an actuator 48 of a striker assembly. The actuator 48 includes a motor 120 connected to a power source of a vehicle via wiring 96. The motor 120 is secured within an actuator housing 92 and is in communication with a pinion 126. The actuator 48 may be fixedly secured within a channel of a side rail via an actuator bracket 124 (see FIG. 10). As shown, the actuator bracket 124 may include a plurality of mounting holes 102 that receive a fastener when positioned within the channel 109 to secure the actuator bracket 124 within the channel 109. The actuator bracket 124 may also include additional mounting holes 102 to secure the mounting bracket 124, attached other components to the mounting bracket 124, or a combination thereof.

During operation, the motor 120 may rotate the pinion 126 via a gearbox 122 connecting the motor 120 to the pinion 126. The pinion 126 may then drive a gear rack 128 movably secured within the channel. When the pinion 126 is rotated, teeth 127 of the pinion 126 communicate with teeth 129 of the gear rack 128 to translate a substantially rotational movement of the pinion 126 to a substantially linear movement of the gear rack 128. The gear rack 128 may also be connected to linkage 118 secured to a latch. When the gear rack 128 moves, the linkage 118 also moves, thereby articulating the latch between an open and closed position (see FIGS. 11A and 11B). During movement of the gear rack 128, a guide pin 64 projecting from the gear rack 128 is guided along one or more slots to move a rail lock between a locked position and an unlocked position (see FIGS. 14-17).

Figure 13:
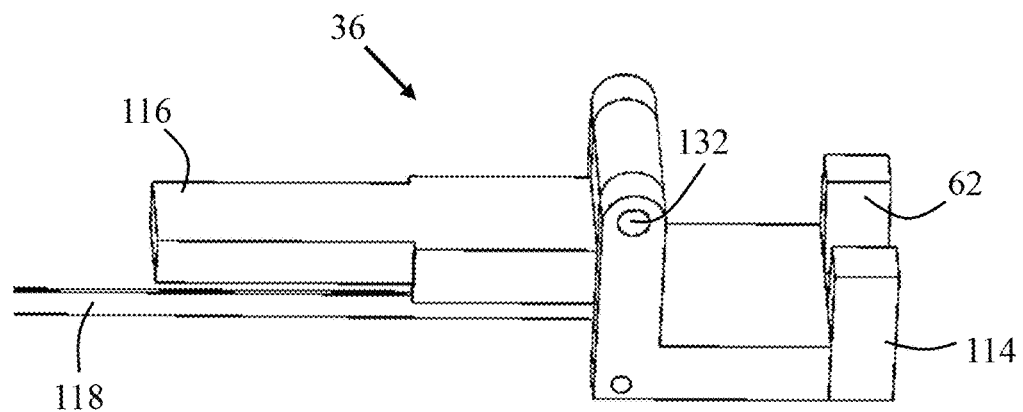
FIG. 13 illustrates a side view of a latch of a striker assembly.

FIG. 13 illustrates a side view of a latch 36 of a striker assembly. The latch 36 includes a hinge 114 pivotally engaged to a base 116 by a latch pin 132. The base 116 may be secured within a channel of a side rail to maintain a position of the latch 36 during operation (see FIG. 11A). The hinge 114 may further include a notch 62 that aligns with a striker plate or other portion of the tonneau cover. The notch 62 may be shaped to receive a portion of the striker plate to secure the latch 36 to the tonneau cover. The hinge 114 may be connected to the actuator by linkage 118 so that, when the actuator drives the linkage 118, the hinge 114 in turn moves between an open position (i.e., a position where the tonneau cover is at least partially opened) and a closed position (i.e., a position where the tonneau cover is substantially covering the cargo box of a vehicle and resting flush along an upper edge of the cargo box). The linkage 118 may be secured to the hinge 114 by one or more pins (not shown).

Figure 14:
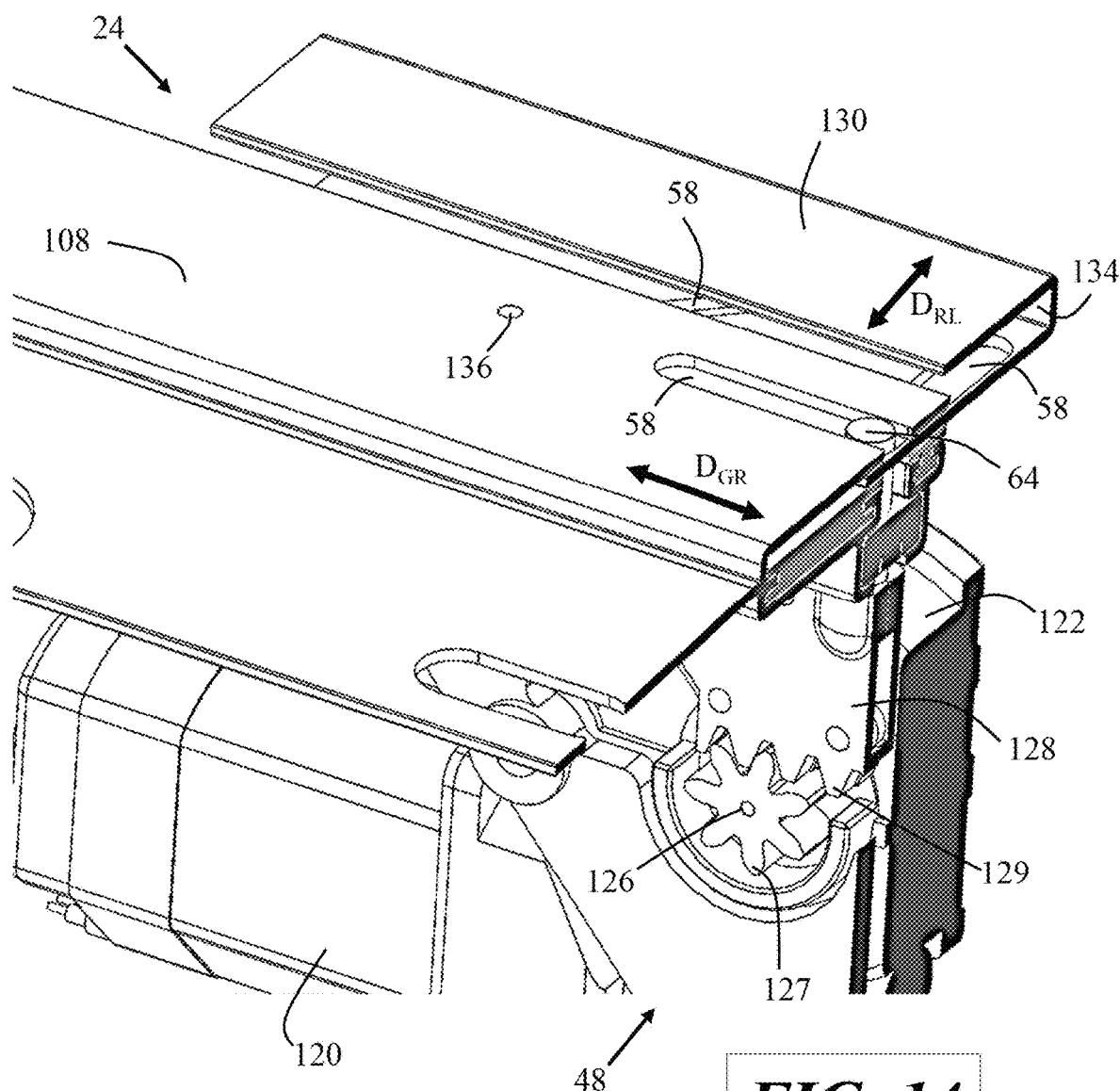
FIG. 14 illustrates a perspective cross-sectional view of an actuator in communication with a side rail and rail lock of a cargo box.

FIG. 14 illustrates a perspective cross-sectional view of an actuator 48 of a striker assembly in communication with a side rail 108 and a rail lock 130 mounted to a cargo box of a vehicle. The actuator 48 includes a motor 120 that rotates a pinion 126 via an intermediate gear box 122. During rotation of the pinion 126, teeth 127 of the pinion 126 engage teeth 129 of a gear rack 128, thereby translating the rotational movement of the pinion 126 into a substantially linear movement of the gear rack 128 in the direction ($D_{GR}$). As the gear rack 128 moves in the direction $D_{GR}$ to open and/or close a latch, a guide pin 64 is guided within a slot 58 of a side rail 108. The slot 58 of the side rail 108 may be substantially parallel to the direction $D_{GR}$ of movement of the gear rack 128. The guide pin 64 may also extend through a slot 58 of a rail lock 130, whereby the slot 58 of the rail lock 130 is positioned substantially perpendicular to the direction $D_{GR}$ of movement of the gear rack 128. As the guide pin 64 moves along the slot 58 of the side rail 108, the rail lock 130 is moved along its own slot 58 in a direction $D_{RQ}$ between a locked position and an unlocked position. The rail lock 130 may receive a portion of the side rail, a portion of a tonneau cover, or both within a lip 134 in the locked position, thereby preventing disconnection and/or opening of the tonneau cover. It is envisioned that as the gear rack 128 drives a latch of the striker assembly to an open position, the rail lock 130 is moved to an unlocked position via the guide pin 64 so that the tonneau cover may be at least partially opened by the latch without interference by the rail lock 130. As shown, the rail lock 130 may also be guided between the locked and unlocked positions along an additional diagonal slot 58 by a rail pin 136 extending through the side rail 108.

Figure 15A:
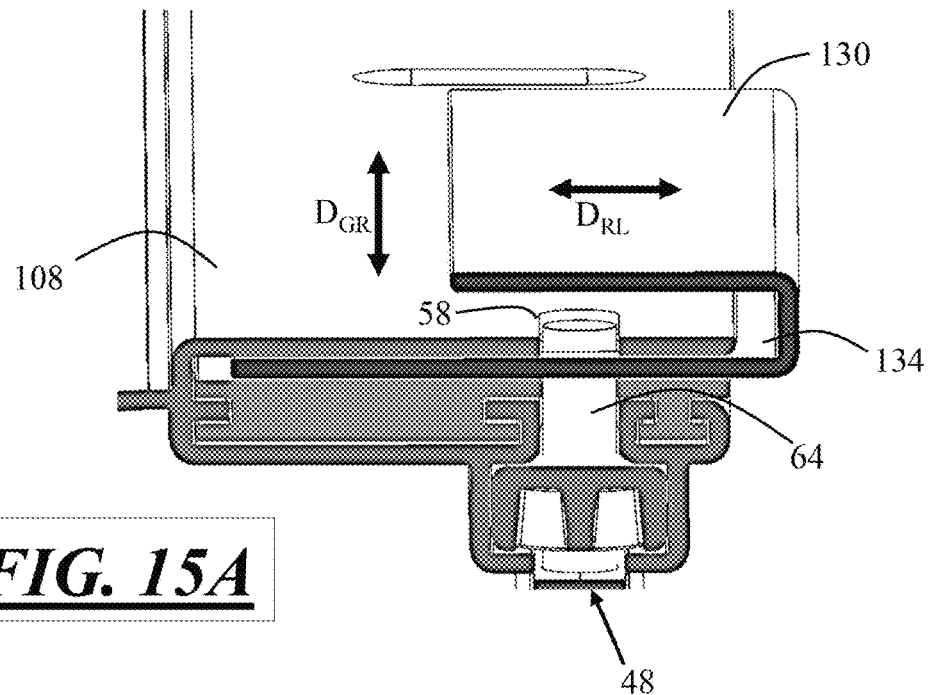
FIG. 15A illustrates a cross-section of a rail lock in a locked position.
Figure 15B:
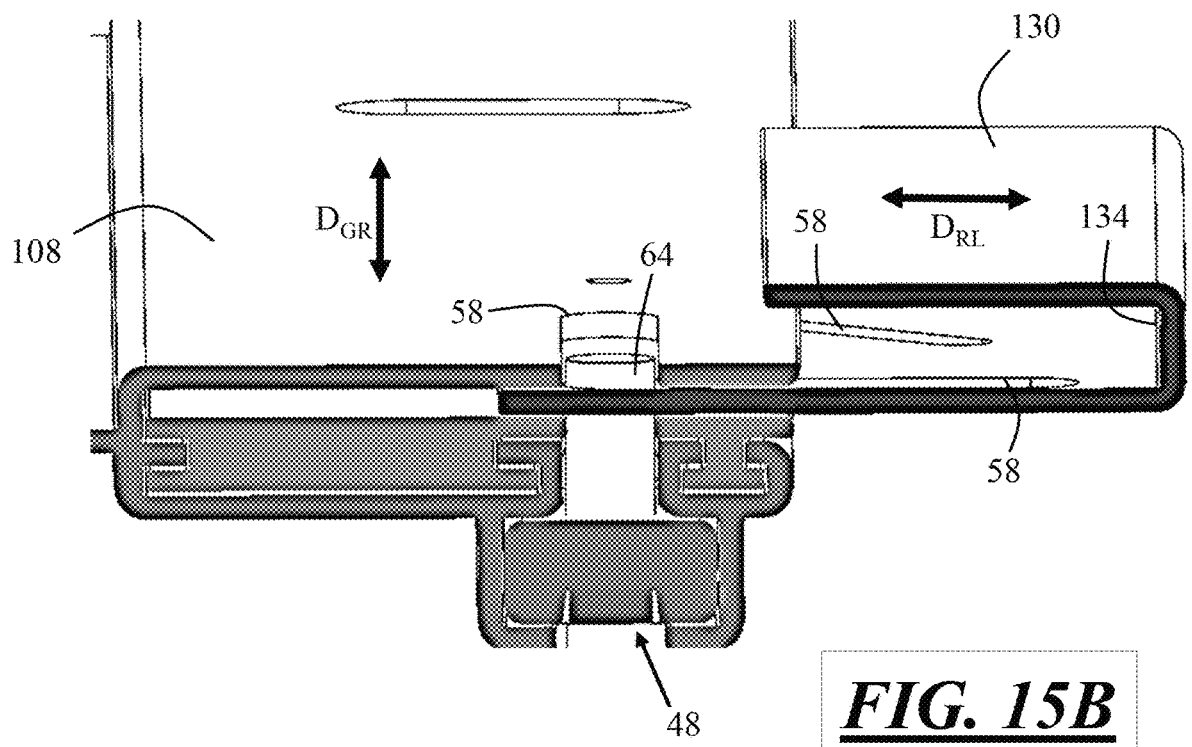
FIG. 15B illustrates a cross-section of a rail lock in an unlocked position.

FIGS. 15A and 15B illustrate a cross-section of a rail lock 130 in a locked position and an unlocked position, respectively. As shown, an actuator 48 of a striker assembly may include a guide pin 64 extending from a movable gear rack (not shown). The guide pin 64 may extend into a slot 58 of a side rail 108 so that the guide pin 64 moves along the side rail 108 in the direction $D_{GR}$. The guide pin 64 may be guided by the slot 58 of the side rail 108 to articulate a latch of the striker assembly (not shown).

As illustrated in FIG. 15A, the guide pin 64 is in a closed position, whereby the rail lock 130 may receive a portion of the side rail 108 within a lip 134 to prevent movement of the side rail 108, a tonneau cover, or both. As the guide pin 64 moves in the direction $D_{GR}$ to an open position (i.e., a position where the latch of the striker assembly is also in an open position and at least partially opens a portion of the tonneau cover), the rail lock 130 is moved in a direction $D_{RL}$.

As shown in FIG. 15B, the guide pin 64 is in an open position, whereby the side rail 108 is no longer positioned within the lip 134 of the rail lock 130. As shown, the guide pin 64 also extends through a slot 58 of the rail lock 130. The slot 58 of the rail lock 130 is positioned substantially perpendicular to the direction $D_{GR}$ of movement of the guide pin 64 (i.e., the direction of movement of the gear rack) so that, when the guide pin 64 moves in the direction $D_{GR}$, the rail lock 130 is guided in the direction $D_{RL}$. Additionally, the rail lock 130 may also be moved along one or more additional diagonal slots 58 by rail pins of the side rail 108 (see FIG. 14). As a result, a linear movement of the guide pin 64 may advantageously drive the rail lock 130 in a direction $D_{RL}$ substantially perpendicular to the direction $D_{GR}$ of the guide pin 64. However, it is also contemplated that the rail lock 130 may move in any direction relative to a direction of movement of the guide pin 64, or vice versa.

It is envisioned that when the guide pin 64 is in the closed position, the rail lock 130 is in a locked position to prevent movement of the tonneau cover, the side rail 108, or both, as shown in FIG. 15A. Similarly, when the guide pin 64 is in the open position, the rail lock 130 is in an unlocked position to allow movement of all or a portion of the tonneau cover, the side rail 108, or both, as shown in FIG. 15B.

Figure 16:
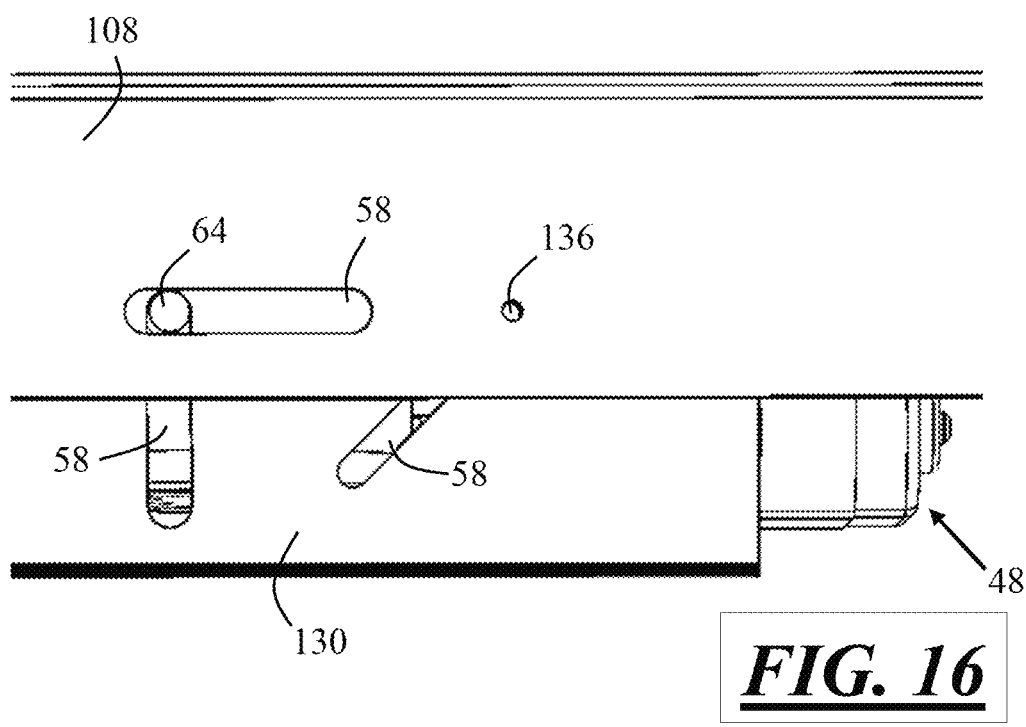
FIG. 16 illustrates a top view of a rail lock in communication with an actuator of a striker assembly.

FIG. 16 illustrates a top view of a rail lock 130 in communication with an actuator 48 of a striker assembly. A portion of the rail lock 130 has been omitted to more accurately depict certain features. Similar to the cross-sectional views in FIGS. 15A and 15B described above, a guide pin 64 of the actuator 48, and more specifically a guide pin 64 of a gear rack of the actuator, extends through a slot 58 of the side rail 108 and a slot 58 of the rail lock 130. As illustrated, the slot 58 of the side rail 108 is substantially perpendicular to the slot 58 of the rail lock 130. During actuation, the guide pin 64 is guided along the slot 58 of the side rail 108, thereby also moving the rail lock 130 along its own slot 58. Additionally, the rail lock 130 may also move diagonally to the side rail 108 by an additional diagonal slot 58 guided by a rail pin 136 of the side rail 108. As such, the rail lock 130 may advantageously move between a locked position and an unlocked position based upon a linear movement of the guide pin 64. It is envisioned that the rail lock 130 may beneficially be able to move both axially and laterally relative to the guide pin 64 between the locked position and the unlocked position.

Figure 17:
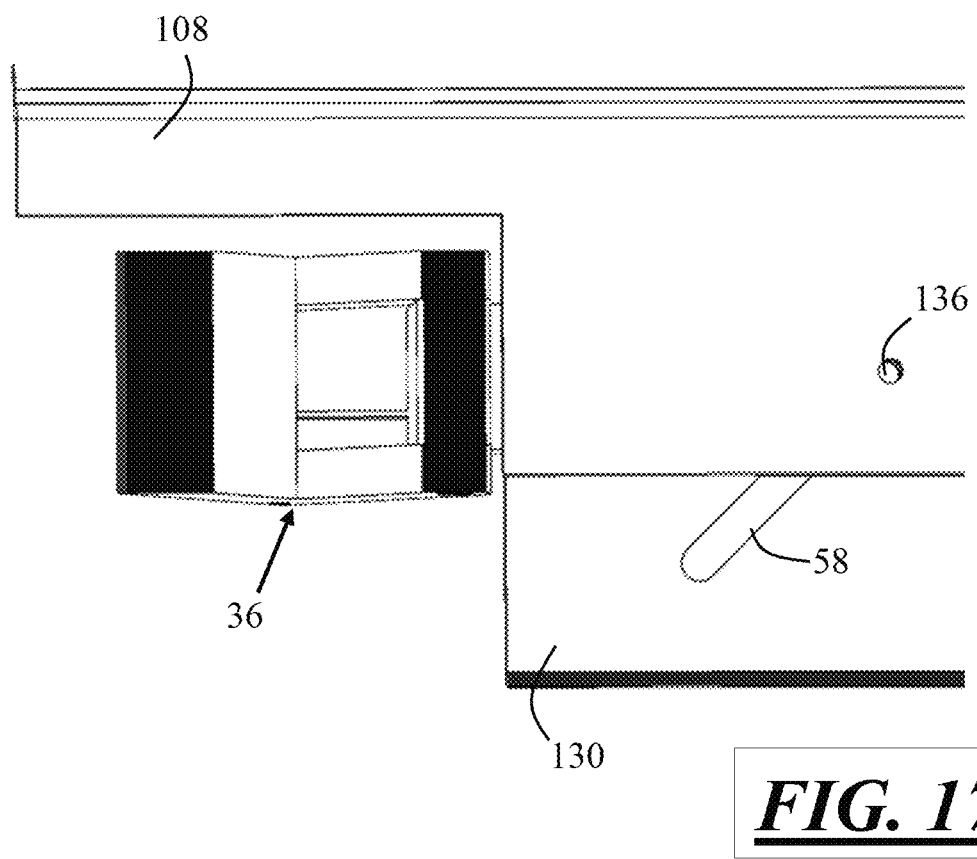
FIG. 17 illustrates a top view of a rail lock near a latch of a striker assembly.

FIG. 17 illustrates a top view of a rail lock 130 near a latch 36 of a striker assembly. A portion of the rail lock 130 has been omitted to more accurately depict certain features. As discussed above, the rail lock 130 may be moved relative to a side rail 108 based upon movement of an actuator of the striker assembly (see, e.g., FIG. 16). The rail lock 130 may include a diagonal slot 58 near the latch that is guided along a rail pin 136 of the side rail 108 to move the rail lock 130 between a locked position and an unlocked position. The slot 58 illustrated in FIG. 17 may be used in conjunction with the slots 58 of the rail lock 130 illustrated in FIG. 16. Therefore, it is envisioned that the rail lock 130 may advantageously move both laterally and axially relative to the side rail 108.

ELEMENT LIST

10 Vehicle
12 Cargo Box
14 Tailgate
16 Tonneau Cover
17 Tonneau Cover Panel
18 Top Edge of the Cargo Box
20 Inside of the Cargo Box
22 Top Edge of Tailgate
24 Striker Assembly
26 Inner Fender
28 Inside Panel
30 Outer Fender
32 Plunger
34 Shaft
36 Latch
38 Spring
40 Cover
42 Aperture in Cover for Latch
44 Aperture in Cover for Shaft 46 Face
48 Actuator
50 Longitudinal Axis of Shaft
52 Housing
52A, 52B Opposing Walls of the Housing
54 Clasp
56 Opening
58 Slot
60 Slot Axis
62 Notch
64 Guide Pin
66 Bracket
68 Rod
70 Casing
72 Bore of the Shaft
80 Retaining Pin
82 First Direction
84 Second Direction
86 Third Direction
88 Fourth Direction
90 Receiver
92 Actuator Housing
94 Armature
96 Wring
98 Pivot Axis of the Latch
100 Fastener
102 Mounting Hole
104 Pivot Direction
106 Truck Cap
108 Side Rail
109 Channel of the Side Rail
110 Striker Plate
112 Ring of the Striker Plate
114 Hinge of the Latch
116 Base of the Latch
118 Linkage
120 Motor
122 Gearbox
124 Actuator Bracket
126 Pinion
127 Teeth of the Pinion
128 Gear Rack
129 Teeth of the Gear Rack
130 Rail Lock
132 Latch Pin
134 Lip of the Rail Lock
136 Rail Pin
$D_{RQ}$ Direction of the Rail Lock
$D_{GR}$ Direction of the Gear Rack
$D_P$ Pivot Direction of the Latch Hinge The explanations and illustrations presented herein are intended to acquaint others skilled in the art with the invention, its principles, and its practical application. The above description is intended to be illustrative and not restrictive. Those skilled in the art may adapt and apply the invention in its numerous forms, as may be best suited to the requirements of a particular use.

Accordingly, the specific embodiments of the present invention as set forth are not intended as being exhaustive or limiting of the teachings. The scope of the teachings should, therefore, be determined not with reference to this description, but should instead be determined with reference to the appended claims, along with the full scope of equivalents to which such claims are entitled. The omission in the following claims of any aspect of subject matter that is disclosed herein is not a disclaimer of such subject matter, nor should it be regarded that the inventors did not consider such subject matter to be part of the disclosed inventive subject matter.

Plural elements or steps can be provided by a single integrated element or step. Alternatively, a single element or step might be divided into separate plural elements or steps.

The disclosure of "a" or "one" to describe an element or step is not intended to foreclose additional elements or steps.

While the terms first, second, third, etc., may be used herein to describe various elements, components, regions, layers and/or sections, these elements, components, regions, layers and/or sections should not be limited by these terms. These terms may be used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Unless otherwise stated, a teaching with the term "about" or "approximately" in combination with a numerical amount encompasses a teaching of the recited amount, as well as approximations of that recited amount. By way of example, a teaching of "about 100" encompasses a teaching of 100+/−15.

The disclosures of all articles and references, including patent applications and publications, are incorporated by reference for all purposes. Other combinations are also possible as will be gleaned from the following claims, which are also hereby incorporated by reference into this written description.

What is claimed is:

1. An assembly comprising:
   (a) a plunger connected to a shaft;
   (b) a latch that is adapted to releasably receive and engage a portion of a tonneau cover, the tonneau cover comprising a side rail; and
   (c) an actuator in communication with the latch to actuate the latch between an open position and a closed position, wherein the actuation is adapted to cause the tonneau cover to move between an open position and a closed position; and
   (d) a rail lock;
      wherein movement of the plunger triggers the actuator to move the latch between the open position and the closed position, whereby a slot of a latch housing is guided along a guide pin of the shaft to move the latch between the open position and the closed position, and
      wherein the rail lock is configured to receive a portion of the side rail and a portion of the tonneau cover to prevent movement of the tonneau cover, and a guide pin extends into a slot of the rail lock to move the rail lock relative to the side rail during actuation of the actuator.

2. The assembly of claim 1, wherein movement of the plunger sends an electrical signal to the actuator to initiate the actuation.

3. The assembly of claim 2, wherein the plunger includes a threaded rod that is threaded into a bore of the shaft, and movement of the shaft based on the movement of the plunger signals the actuator to initiate the actuation.

4. An assembly comprising:
(a) a latch adapted to releasably engage a tonneau cover or a truck cap; and
(b) an actuator in communication with the latch to actuate the latch between an open position and a closed position, wherein the actuation is adapted to cause the tonneau cover or the truck cap to move between an open position and a closed position;
wherein the actuation is initiated wirelessly based on an input signal received by the actuator and the latch is guided along a slot in a housing of the latch and an axis of the slot is substantially parallel to, or coaxial with, a direction of movement of the latch,
wherein the latch includes a notch that receives and secures a portion of the tonneau cover or the truck cap, the notch secures the portion of the tonneau cover or the truck cap with a clasp movably engaged to the notch.

5. The assembly of claim 4, wherein the actuator includes an armature connected to the latch that moves the latch between the open position and the closed position.

6. The assembly of claim 4, wherein the latch is guided along the slot in a linear direction.

7. The assembly of claim 6, wherein the latch is guided along the slot by a stationary guide pin positioned within the housing of the latch.

8. The assembly according to claim 4, wherein the striker assembly is mounted to a vehicle and movement of a tailgate of the vehicle sends a signal to the actuator to initiate the actuation of the latch.

9. An assembly comprising:
(a) a latch that releasably engages a tonneau cover or a truck cap, the tonneau cover or the truck cap having a side rail; and
(b) an actuator connected to the latch by linkage to actuate the latch between an open position and a closed position, the actuator comprising:
(1) a motor;
(2) a pinion driven by the motor; and
(3) a gear rack in communication with the pinion to translate movement of the pinion into movement of the gear rack, wherein a guide pin of the gear rack extends into a slot of the side rail to guide the gear rack along the side rail;
wherein the tonneau cover or the truck cap includes a rail lock that receives a portion of the side rail within a lip to prevent movement of the tonneau cover or truck cap, and the guide pin also extends into a slot of the rail lock to move the rail lock relative to the side rail during articulation.

10. The assembly of claim 9, wherein the pinion is rotated by the motor to move the gear rack linearly to actuate the latch.

11. The assembly of claim 10, wherein the motor communicates with an intermediary gear box to drive the pinion.

12. The assembly of claim 9, wherein the actuator further includes an actuator bracket, and the actuator bracket is secured within a side rail of a cargo box so that the actuator remains stationary while the gear rack moves along the side rail.

13. The assembly of claim 12, wherein the rail lock moves both axially and laterally relative to the side rail.

14. The assembly of claim 13, wherein the slot of the rail lock is substantially perpendicular to the slot of the side rail.

15. The assembly of claim 14, wherein the rail lock includes a diagonal guide that is guided by a rail pin of the side rail during the articulation of the assembly.

* * * * *

UNITED STATES PATENT AND TRADEMARK OFFICE
CERTIFICATE OF CORRECTION

| | | |
|---|---|---|
| PATENT NO. | : 11,725,433 B2 | |
| APPLICATION NO. | : 16/953839 | |
| DATED | : August 15, 2023 | |
| INVENTOR(S) | : Chad Carter and Jerome Facchinello | |

It is certified that error appears in the above-identified patent and that said Letters Patent is hereby corrected as shown below:

In the Claims

Column 25, Line 37, Claim 8 delete "striker" after "wherein the"

Signed and Sealed this
Tenth Day of October, 2023

Katherine Kelly Vidal
*Director of the United States Patent and Trademark Office*